United States Patent
Mankovitz

(10) Patent No.: US 6,549,719 B2
(45) Date of Patent: Apr. 15, 2003

(54) TELEVISION PROGRAM RECORD SCHEDULING AND SATELLITE RECEIVER CONTROL USING COMPRESSED CODES

(75) Inventor: Roy J. Mankovitz, Encino, CA (US)

(73) Assignee: GemStar Development Corporation, Pasadena, CA (US)

(*) Notice: Subject to any disclaimer, the term of this patent is extended or adjusted under 35 U.S.C. 154(b) by 0 days.

(21) Appl. No.: 09/846,071

(22) Filed: Apr. 30, 2001

(65) Prior Publication Data

US 2001/0024566 A1 Sep. 27, 2001

Related U.S. Application Data

(63) Continuation of application No. 08/243,474, filed on May 16, 1994, now abandoned.

(51) Int. Cl.[7] .............................. H04N 5/91; H04N 5/44
(52) U.S. Cl. ............................. 386/83; 386/46; 348/734
(58) Field of Search ........................... 386/83, 92, 109, 386/111, 112, 46–52, 4; 725/86, 87, 88, 101, 102; 348/14.05, 734; H04N 5/91, 5/44

(56) References Cited

U.S. PATENT DOCUMENTS

| | | |
|---|---|---|
| 4,079,419 A | 3/1978 | Siegle et al. |
| 4,081,754 A | 3/1978 | Jackson |
| 4,193,120 A | 3/1980 | Yello |
| 4,206,483 A | 6/1980 | Nakamura |
| 4,267,563 A | 5/1981 | Sato et al. |
| 4,310,924 A | 1/1982 | Miyasaka et al. |
| 4,325,081 A | 4/1982 | Abe et al. |

(List continued on next page.)

FOREIGN PATENT DOCUMENTS

| | | |
|---|---|---|
| DE | 2333116 | 1/1975 |
| DE | 2445520 | 4/1976 |
| DE | 2612260 | 9/1977 |
| EP | 0122626 | 10/1984 |
| EP | 0133985 | 3/1985 |
| GB | 2126002 | 3/1984 |

*Primary Examiner*—Robert Chevalier
(74) *Attorney, Agent, or Firm*—Christie, Parker & Hale, LLP

(57) ABSTRACT

A code converter is provided in a satellite remote controller for converting commands from an instant programmer or universal remote into commands recognizable by a satellite receiver. The commands are sent to a satellite receiver to command the satellite receiver on and off and to select the proper channel in the satellite receiver. Communication between the satellite remote controller and the satellite receiver can be either via infrared or radio frequency (RF) signals. In an embodiment of the invention, encoded video recorder/player timer programming information listed in a television calendar, which allows a timer programming feature on a video cassette recorder VCR to be programmed using a compressed code of as few as 1 to 8 digits, is decoded by a decoder built into an instant programmer to convert the compressed code into channel, date, time and length information. At the appropriate time the instant programmer transmits the proper commands to a VCR to command the recording of the selected program. To allow the instant programmer to command the satellite receiver to turn on and tune to the proper channel for recording the selected program, the instant programmer sends commands to the satellite receiver remote controller and the code converter in the satellite remote controller converts the commands from the instant programmer into commands recognizable by the satellite receiver. Then the commands are sent to the satellite receiver to command the satellite receiver on and off and to select the proper channel in the satellite receiver.

11 Claims, 18 Drawing Sheets

U.S. PATENT DOCUMENTS

| | | |
|---|---|---|
| 4,329,684 A | 5/1982 | Monteath et al. |
| 4,334,242 A | 6/1982 | Mangold |
| 4,381,522 A | 4/1983 | Lambert |
| 4,390,901 A | 6/1983 | Keiser |
| 4,435,842 A | 3/1984 | Mayumi et al. |
| 4,449,249 A | 5/1984 | Price |
| 4,475,153 A | 10/1984 | Kihara et al. |
| 4,481,412 A | 11/1984 | Fields |
| 4,488,179 A | 12/1984 | Krüger et al. |
| 4,519,003 A | 5/1985 | Scholz |
| 4,593,414 A | 6/1986 | Koyanagi |
| 4,598,288 A | 7/1986 | Yarbrough et al. |
| 4,605,973 A | 8/1986 | Von Kohorn |
| 4,621,259 A | 11/1986 | Schepers et al. |
| 4,623,887 A | 11/1986 | Welles, II |
| 4,625,080 A | 11/1986 | Scott |
| 4,631,601 A | 12/1986 | Brugliera et al. |
| 4,635,121 A | 1/1987 | Hoffman et al. |
| 4,638,359 A | 1/1987 | Watson |
| 4,641,205 A | 2/1987 | Beyers, Jr. |
| 4,703,359 A | 10/1987 | Rumbolt et al. |
| 4,706,121 A | 11/1987 | Young |
| 4,718,112 A | 1/1988 | Shinoda |
| 4,751,578 A | 6/1988 | Reiter et al. |
| 4,755,883 A | 7/1988 | Uehira |
| 4,771,283 A | 9/1988 | Imoto |
| 4,807,031 A | 2/1989 | Broughton et al. |
| 4,825,200 A | 4/1989 | Evans et al. |
| 4,841,368 A | 6/1989 | Rumbolt et al. |
| 4,843,482 A | 6/1989 | Hegendörfer |
| 4,866,434 A | 9/1989 | Keenan |
| 4,885,579 A | 12/1989 | Sandbank |
| 4,899,370 A | 2/1990 | Kameo et al. |
| 4,998,292 A | 3/1991 | Eigeldinger et al. |
| 5,081,534 A | 1/1992 | Geiger et al. |
| 5,151,789 A | 9/1992 | Young |
| 5,303,063 A | 4/1994 | Kim et al. |
| 5,307,173 A * | 4/1994 | Yuen et al. |
| 5,748,716 A * | 5/1998 | Levine |

* cited by examiner

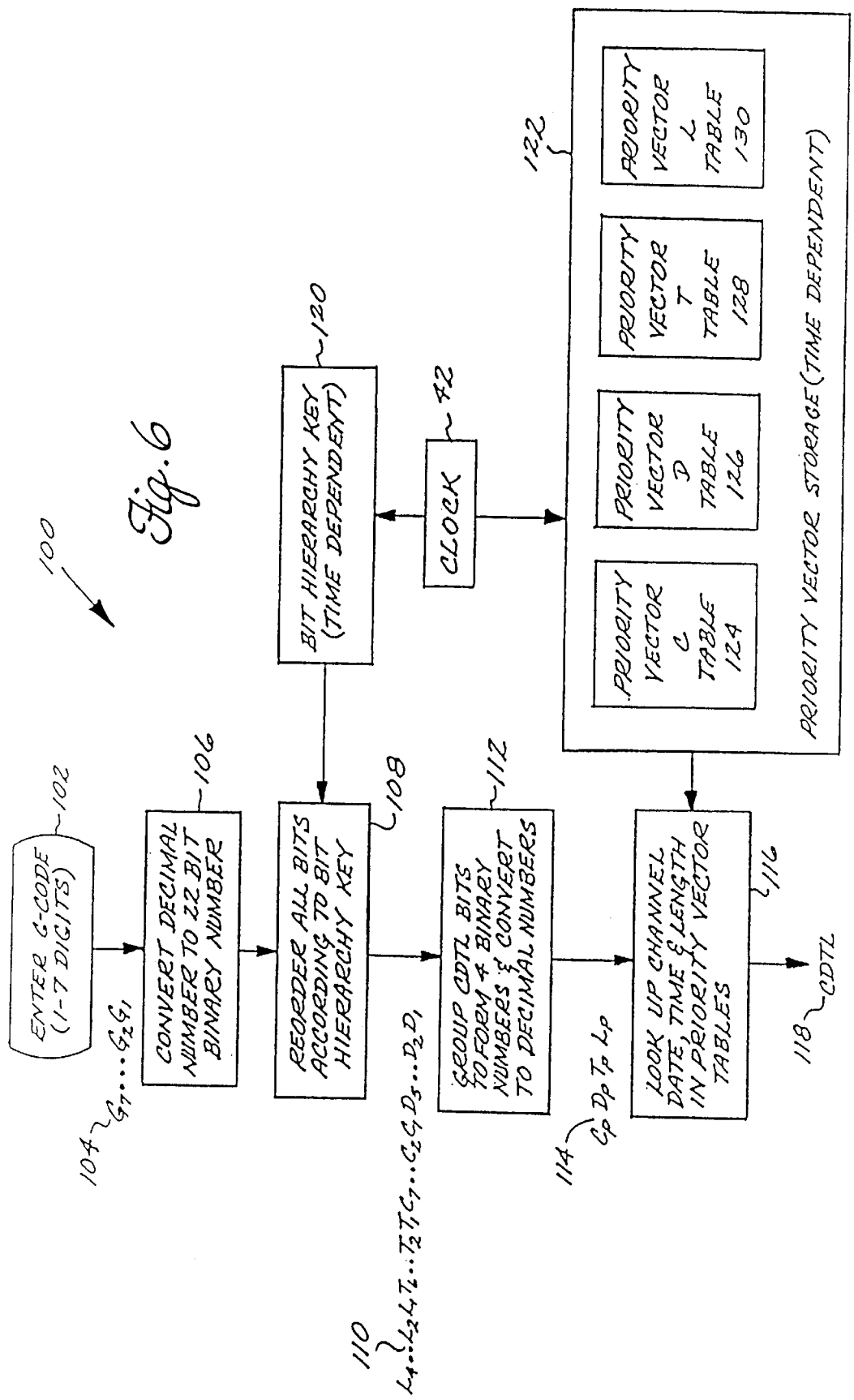

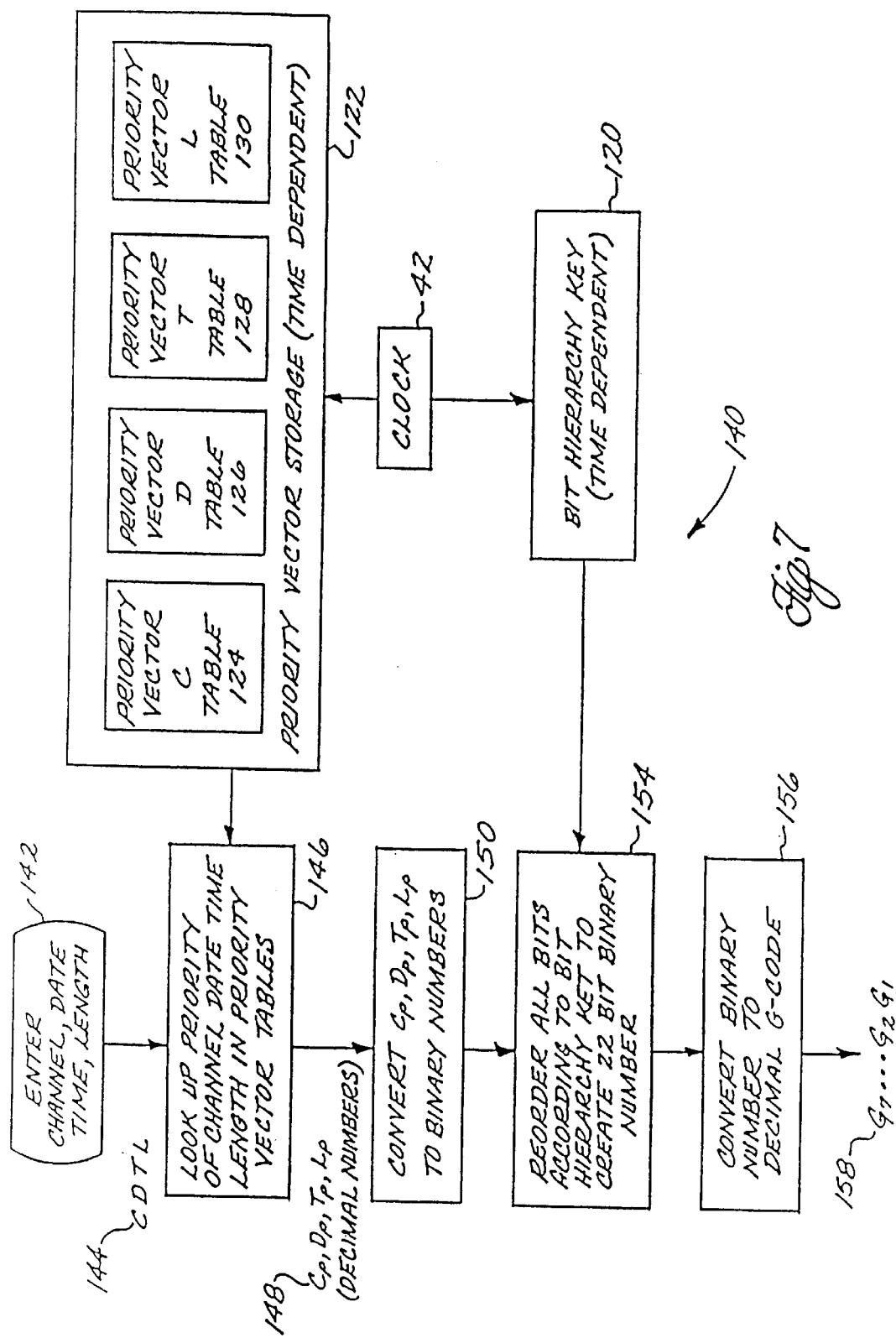

THURSDAY ~204                                    FEBRUARY 9, 1989 ~202

208 — |18| SPORTS RETROSPECTIVE; 60 MIN. [6871]
6PM   |24| NATURE SCENE [532]
206   A VISIT TO THE COLORADO NATIONAL MONUMENT
      NEAR GRAND JUNCTION, WHERE WILDFLOWERS,
      INSECT AND BIRDS ARE OBSERVED
      |34| |52| NOTICIAS [62921][496649]
      |40| DWIGHT THOMPSON--RELIGION; [685553]
      |50| HUMANITIES THROUGH THE ARTS [4930655]
      |56| BEVERLY HILLBILLIES -- COMEDY [496777]

FRIDAY ~204                                      FEBRUARY 10, 1989 ~202

|CB| |D8| MOVIE--DRAMA; 70 MIN. (2362713)
6:30  |11| FAMILY TIES (CC) -- COMEDY [5657]
206   MALLORY'S REUNION WITH HER COLLEGE BOY FRIEND
      (JOHN DUKAKIS) HAS HER WORRIED THAT SHE MAY
      NOT BE AS INTERESTING TO HIM AS SHE ONCE WAS.    200
208 — |56| HOGAN'S HEROES - COMEDY [510857]
      CARTER'S MASQUERADE AS A TRAITOR MAY BE
      KAPUT: A LOVELY FRAULEIN IS TRYING TO POISON HIM
      |C14| DOUBLE DARE-GAME (29225) — 212
      |C11| VIDEOCOUNTRY (29129)
      |C7| |USA| CARTOON EXPRESS (23561)
7PM   |5| CHARLES IN CHARGE (CC) - COMEDY [065]
206   WHILE PLANNING A PIZZA-PARLOR PARTY, CHARLES
      ALIENATES THE POWELL CHILDREN BY DISMISSING
      THEIR SUGGESTIONS ABOUT ORGANIZING THE EVENT.

*Fig 8*

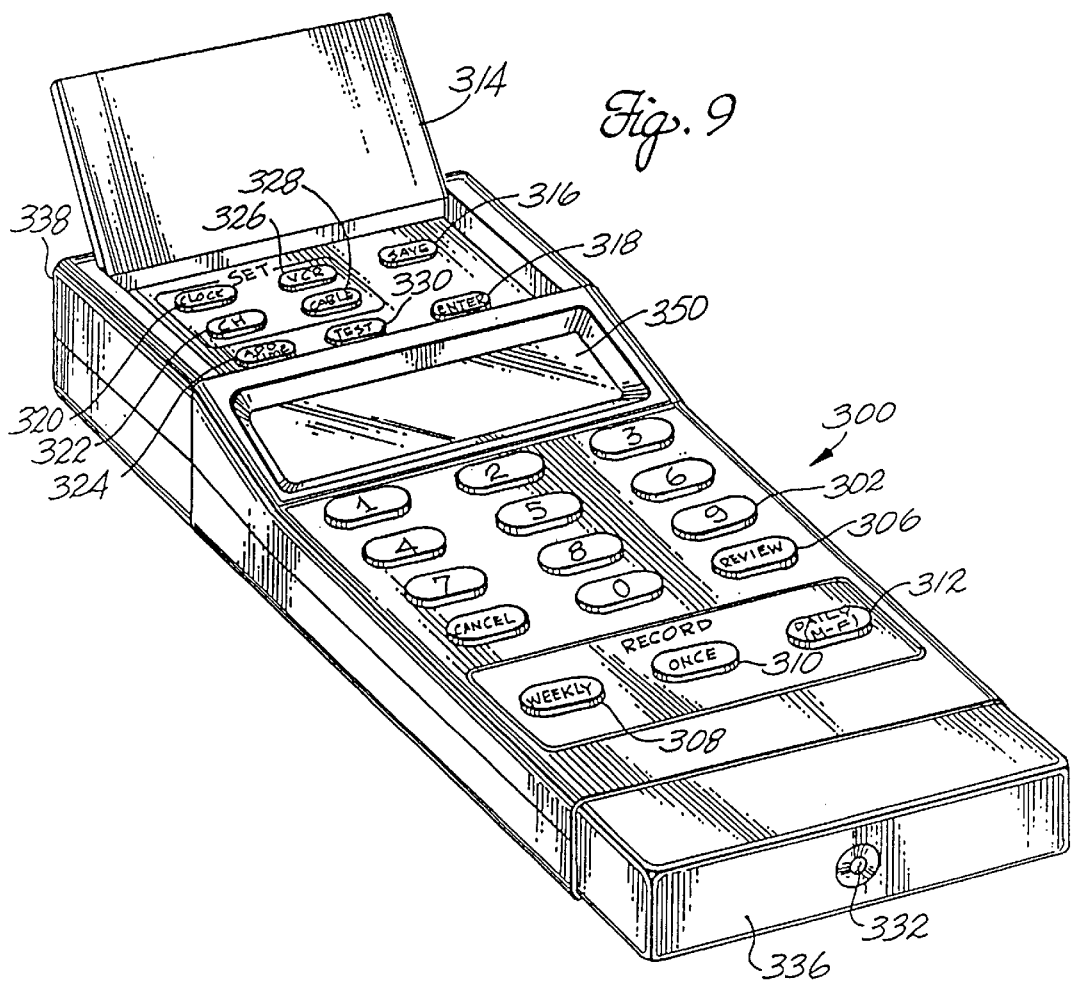
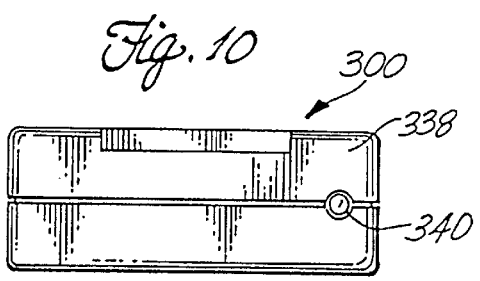

TELEVISION PROGRAM RECORD SCHEDULING AND SATELLITE RECEIVER CONTROL USING COMPRESSED CODES

CROSS-REFERENCE TO RELATED APPLICATIONS

This application is a continuation of application Ser. No. 08/243,474 filed on May 16, 1994, now abandoned, the content of which is incorporated herein by reference.

BACKGROUND OF THE INVENTION

1. Field of the Invention

This invention relates generally to video cassette recorder systems and particularly to the timer preprogramming feature of video cassette recorders (VCRs), to an apparatus and method for using encoded information to shorten the time required to perform timer preprogramming, to an apparatus and method of using the encoded information to control a satellite receiver, and to an apparatus and method for converting commands in a satellite remote controller to satellite receiver commands.

2. Description of the Related Art

The video cassette recorder (VCR) has a number of uses, including playing back of tapes filmed by a video camera, playing back of pre-recorded tapes, and recording and playing back of broadcast and cable television programs.

To record a television program in advance of viewing it, a two-step process is often used: (1) obtain the correct channel, date, time and length (CDTL) information from a television program guide, and (2) program this CDTL information into the VCR. Depending on the model, year and type of the VCR, the CDTL information can be programmed in various ways including: (i) pushing an appropriate sequence of keys in the console according to instructions contained in the user's manual, (ii) pushing an appropriate sequence of keys in a remote hand-held control unit according to instructions contained in the user's manual (remote programming), and (iii) executing a series of keystrokes in the remote hand-held control unit in response to a menu displayed on the television screen (on-screen programming). Other techniques for timer preprogramming have been suggested including: (iv) reading in certain bar-code information using a light pen (light pen programming), and (v) entering instructions through a computer or telephone modem. These various methods differ only in the physical means of specifying the information while the contents, being CDTL and certain power/clock/timer on-off commands are generally common although the detailed protocol can vary with different model VCRs. Methods (i) and (ii) described above can require up to 100 keystrokes, which has inhibited the free use of the timer preprogramming feature of VCRs. To alleviate this, new VCR models have included an "On-Screen Programming" feature, which permits remote input of CDTL information in response to a menu displayed on the television screen. Generally on screen programming of CDTL information requires an average of about 18 keystrokes, which is less than some of the prior methods but still rather substantial. Some of the other techniques such as (iv) above, require the use of special equipment such as a bar code reader.

In general the present state of the art suffers from a number of drawbacks. First, the procedure for setting the VCR to record in advance can be quite complex and confusing and difficult to learn; in fact, because of this many VCR owners shun using the timer preprogramming record feature. Second, the transcription of the CDTL information to the VCR is hardly ever error-free; in fact, many users of VCR's timer preprogramming features express concern over the high incidence of programming errors. Third, even for experienced users, the process of entering a lengthy sequence of information on the channel, date, time and length of desired program can become tedious. Fourth, techniques such as reading in bar-code information or using a computer require special equipment. These drawbacks have created a serious impedance in the use of a VCR as a recording device for television programs. The effect is that time shifting of programs has not become as popular as it once was thought it would be. Accordingly, there is a need in the art for a simpler system for effecting VCR timer preprogramming which will enable a user to take advantage of the recording feature of a VCR more fully and freely.

SUMMARY OF THE INVENTION

A principal object of a parent invention is to provide an improved system for the selection and entering of channel, date, time and length (CDTL) information required for timer preprogramming of a VCR which is substantially simpler, faster and less error-prone than present techniques. Another principal object of a parent invention is to provide televisions having an embedded capability for timer programming control.

To program the timer preprogramming feature of a video system, there is an apparatus and method for using encoded video recorder/player timer preprogramming information. The purpose is to significantly reduce the number of keystrokes required to set up the timer preprogramming feature on a VCR. In accordance with this invention it is only necessary for the user to enter a code with 1 to 7 digits or more into the VCR. This can be done either remotely or locally at the VCR. Built into either the remote controller or the VCR is a decoding means which automatically converts the code into the proper CDTL programming information and activates the VCR to record a given television program with the corresponding channel, date, time and length. Generally multiple codes can be entered at one time for multiple program selections. The code can be printed in a television program guide in advance and selected for use with a VCR or remote controller with the decoding means.

Another principal object of a parent invention is to embed the decoding means into a television. The television would then at the appropriate time distribute the proper commands to a VCR and a cable box to record the desired program. The user would use a remote controller or controls on the television to enter the code that signifies the program to be recorded. The same remote controller and controls on the television would also be used to perform normal control functions, such as channel selection. When the codes are entered they are transmitted to the television and the decoder in the television, which decodes the codes into CDTL information and then the codes themselves and the CDTL information could be displayed "on screen" so that the user can verify that the proper codes have been entered. Then at the appropriate time the television would transmit the proper commands to a VCR and a cable box, if necessary, to command the recording of the selected program. This control function can be carried out by using an infrared link by placing infrared transmitters on the television cabinet, preferably at the corners. The television circuitry would include the capability of storing or learning the infrared code protocols for the VCR and the cable box.

Another principal object of a parent invention is to embed the decoding means into various equipments associated with television, such as a video cassette recorder, cable box or satellite receiver. In any system the decoding means would only have to be present in one of the equipments, such as the cable box, which would then at the appropriate time distribute the proper commands to the other equipments such as a VCR and a satellite receiver to record the desired program. The user would use a remote controller or controls on the equipment with the decoder to enter the code that signifies the program to be recorded. The same remote controller would also be used to perform normal remote control functions, such as channel selection. When the codes are entered they are transmitted to the equipment with the decoder, which decodes the codes into CDTL information. Then at the appropriate time the equipment with the decoder would transmit the proper commands to other equipment such as a VCR, satellite receiver and a cable box to command the recording of the selected program. This control function can be carried out by using an infrared link by coupling infrared transmitters on the equipment with the decoder. The infrared transmitter can be placed in a infrared dome on the equipment, mounted behind the front panel, attached to a mouse coupled via a cable to the equipment with the decoder with the mouse placed near the receiver, or attached to a stick on miniature mouse coupled via a cable to the equipment with the decoder with the miniature mouse attached to the device with the receiver. The equipment with the decoder would include the capability of storing or learning the infrared code protocols for the other equipment, such as a VCR, satellite receiver and a cable box.

A principal object of the patent invention is to provide a code converter in a satellite remote controller for converting commands from an instant programmer or another remote controller into satellite receiver commands. Commands are sent from an instant programmer or other remote controller to the satellite remote controller and converted into satellite receiver commands by the code converter. Then the commands are sent to a satellite receiver to command the satellite receiver on and off and to select the proper channel in the satellite receiver. Communication between the satellite remote controller and the satellite receiver can be either via infrared or radio frequency (RF) signals.

Other objects and many of the attendant features of this invention will be more readily appreciated as the same becomes better understood by reference to the following detailed descriptions and considered in connection with the accompanying drawings in which like reference symbols designate like parts throughout the figures.

BRIEF DESCRIPTION OF THE DRAWINGS

FIG. 6 is a flow graph of the G-code decoding technique, according to an embodiment of the invention;

FIG. 7 is a flow graph of the G-code encoding technique, according to an embodiment of the invention;

FIG. 8 is an illustration of part of a television calendar according to this invention;

FIG. 9 is a perspective view of an apparatus for using compressed codes for recorder preprogramming according to an embodiment of the invention;

FIG. 10 is a front view of the apparatus showing a forward facing light emitting diode, according to an embodiment of the invention;

DESCRIPTION OF THE PREFERRED EMBODIMENTS

Figure 1:
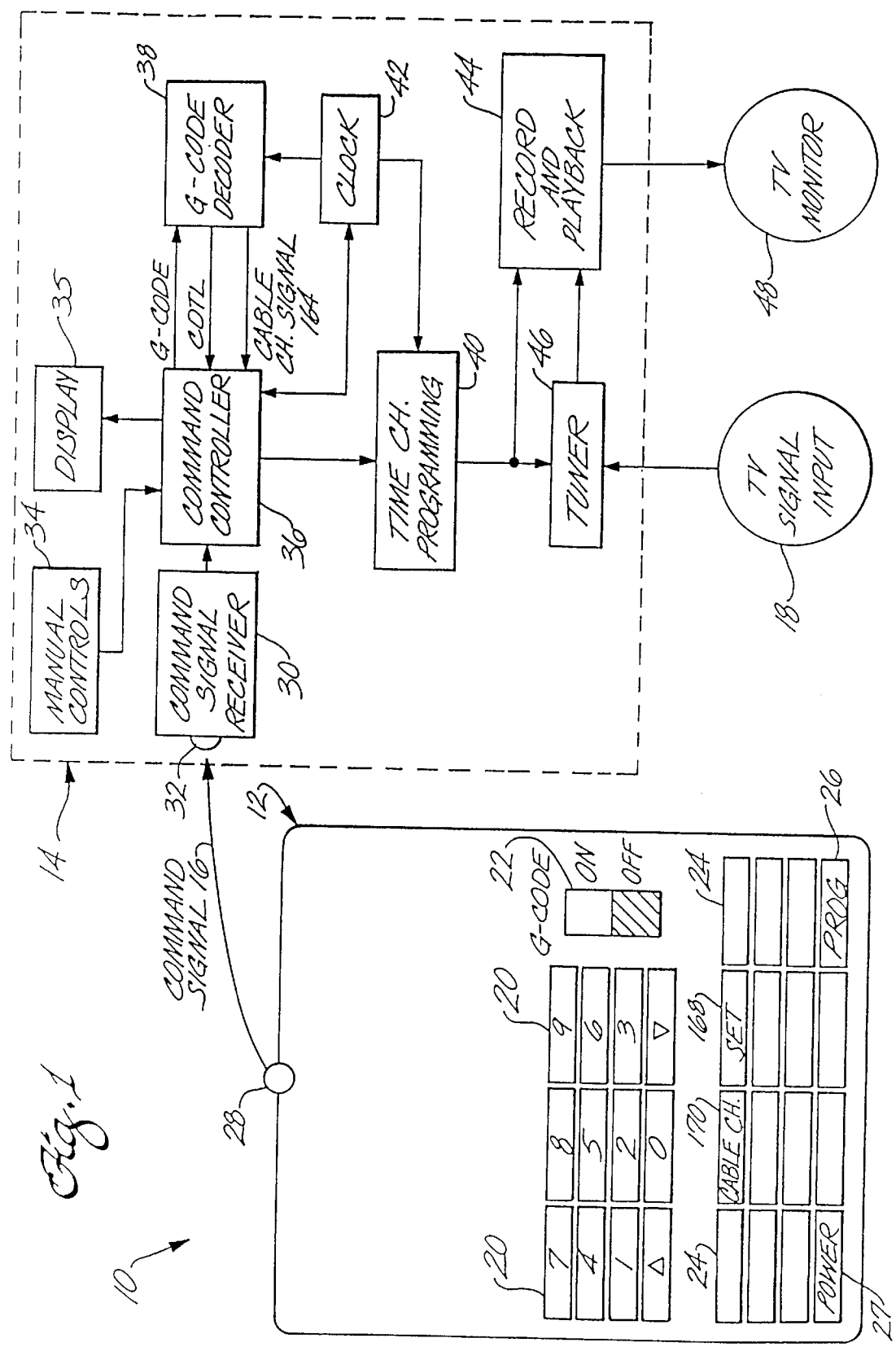
FIG. 1 is a schematic showing apparatus with the code decoder means embedded in the video cassette recorder, according to an embodiment of the invention.

Referring now to the drawings, and more particularly, to FIG. 1, there is shown an apparatus for using encoded video recorder/player timer preprogramming information 10 according to this invention. The primary components include a remote controller 12 and a video cassette recorder/player with G-code decoder 14, which can be controlled by remote controller 12 via a command signal 16. The remote controller 12 can have a number of keys, which include numerical keys 20, G-code switch 22, function keys 24, program key 26 and power key 27. There are means in the remote controller 12 that interprets each key as it is pressed and sends the proper command signal 16 to the VCR via an infra-red light emitting diode 28. Except for the G-code switch 22 on the remote controller 12 in FIG. 1, the remote controller 12 is essentially the same as any other remote controller in function. The G-code switch 22 is provided just to allow the user to lock the remote controller 12 in the G-code mode while using a G-code, which is the name given to the compressed code which is the encoded CDTL information, to perform timer preprogramming.

A G-code consists of 1 to 7 digits, although more could be used, and is associated with a particular program. A user would look up the G-code in a program guide and just enter the G-code on the remote controller 12, instead of the present state of the art, which requires that the user enter the actual channel, date, time and length (CDTL) commands.

In order to understand the advantages of using a G-code, it is helpful to describe the best of the current state of the art, which is "on screen programming" with direct numerical entry. This technique involves about 18 keystrokes and the user has to keep switching his view back and forth between the TV screen and the remote controller while entering the CDTL information. This situation may be akin to a user having to dial an 18 digit telephone number while reading it from a phone book. The number of keys involved and the switching back and forth of the eye tend to induce errors. A typical keying sequence for timer recording using on-screen CDTL programming is as follows:

PROG 2 1 15 07 30 2 08 00 2 04 PROG

The first program (PROG) key 26 enters the programming mode. Then a sequence of numerals key 20 are pushed. The 2 means it is timer recording rather than time setting. The 1 means the user is now entering the settings for program 1. The 15 is the date. The 07 is starting hour. The 30 is a starting minute. The 2 means pm. The next sequence 08 00 2 is the stopping time. The 04 is channel number. Finally, the PROG is hit again to exit the program mode.

By contrast, this command could have been "coded" and entered in a typical G-code sequence as follows: PROG 1138 PROG. To distinguish that the command is a coded G-code, the G-code switch 22 should be turned to the "ON" position. Instead of having a switch, a separate key "G" can be used. The G-code programming keystroke sequence would then be: G 1138 PROG.

The use of a G-code does not preclude "on-screen" confirmation of the program information that has been entered. When the keystrokes "PROG 1138 PROG" are entered with the G-code switch in the "ON" position, the G-code would be decoded and the television could display the following message:

| PROGRAM | DATE | START TIME | STOP TIME | CHANNEL |
|---------|------|------------|-----------|---------|
| 1138    | 15   | 7:30 PM    | 8:00 PM   | 4       |

In order for the G-code to be useful it must be decoded and apparatus for that purpose must be provided. Referring to FIG. 1, a video cassette recorder/player with G-code coder 14 is provided to be used in conjunction with remote controller 12. The command signal 16 sent from the remote controller 12 is sensed by the photodiode 32 and converted to electrical signals by command signal receiver 30. The electrical signals are sent to a command controller 36, which interprets the commands and determines how to respond to the commands. As shown in FIG. 1, it is also possible for the command controller 36 to receive commands from the manual controls 34 that are normally built into a VCR. If the command controller 36 determines that a G-code was received then the G-code will be sent to the G-code decoder 38 for decoding. The G-code decoder 38 converts the G-code into CDTL information, which is used by the command controller 36 to set the time/channel programming 40. Built into the VCR is a clock 42. This is normally provided in a VCR and is used to keep track of the date and time. The clock 42 is used primarily by the time/channel programming 40 and the G-code decoder 38 functions. The time/channel programming 40 function is set up with CDTL information by the command controller 36. When the proper date and time is read from clock 42, then the time/channel programming 40 function turns the record/playback 44 function "ON" to record. At the same time the tuner 46 is tuned to the proper channel in the television signal 18. Later the user can command the record/playback 44 function to a playback mode to watch the program via the television monitor 48.

An alternate way to control the recorder is to have the command controller 36 keep all the CDTL information instead of sending it to the time/channel programming 40. The command controller would also keep track of the time by periodically reading clock 42. The command controller would then send commands to the time/channel programming 40 to turn on and off the recorder and to tuner 46 to cause it to tune to the right channel at the right time according to the CDTL information.

The clock 42 is also an input to G-code decoder 38, which allows the G-code decoding to be a function of the clock, which lends a measure of security to the decoding technique and makes it harder to copy. Of course this requires that the encoding technique must also be a function of the clock.

Figure 2:
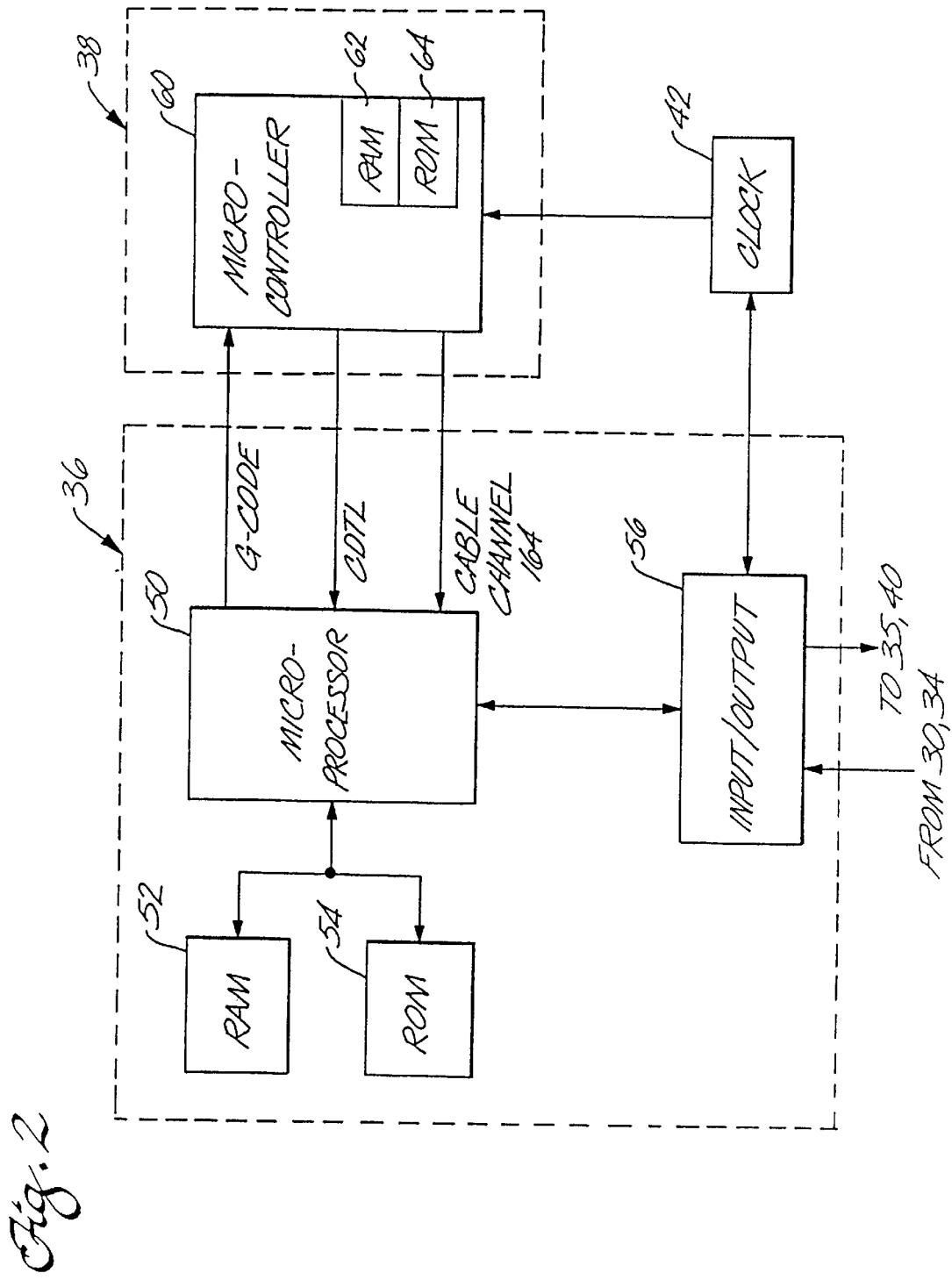
FIG. 2 is a schematic of the VCR embedded processors for command control and code decoding, according to an embodiment of the invention.

A possible realization of the command controller 36 and the G-code decoder 38 is shown in FIG. 2. The command controller 36 function can be realized with a microprocessor 50, a random access memory 52 and a read only memory 54, which is used for program storage. The input/output 56 function is adapted to receive commands from the command signal receiver 30, the manual controls 34 and the clock 42, and to output signals to a display 35, the clock 42, and the time/channel programming 40 function. If the microprocessor 50 interprets that a G-code has been received, then the G-code is sent to microcontroller 60 for decoding. The microcontroller 60 has an embedded random access memory 62 and an embedded read only memory 64 for program and table storage. The clock 42 can be read by both microprocessor 50 and microcontroller 60.

An alternative to having microcontroller 60 perform the G-code decoding is to build the G-code decoding directly into the program stored in read only memory 54. This would eliminate the need for microcontroller 60. Of course, other hardware to perform the G-code decoding can also be used. The choice of which implementation to use is primarily an economic one.

The blocks in FIGS. 1 and 2 are well known in the prior art and are present in the following patents: Fields, U.S. Pat.

No. 4,481,412; Scholz, U.S. Pat. No. 4,519,003; and Brugliera, U.S. Pat. No. 4,631,601. For example, clock 42 is analogous to element 7 in Scholz and element 17 in Brugliera. Other analogous elements are: command signal receiver 30 and Scholz 14 and Brugliera 12; tuner 46 and Scholz 6 and Brugliera 10; time/channel programming 40 and Scholz 8, 11 and ugliera 16; record & playback 44 and Scholz 1, 2, 4; command controller 36 and Scholz 11, 10 and Brugliera 12; microprocessor 50 and Fields 27; RAM 62 and Fields 34; ROM 54 and Fields 33; manual controls 34 and Scholz 15, 16; and remote controller 12 and Scholz 26 and Brugliera 18.

Figure 3:
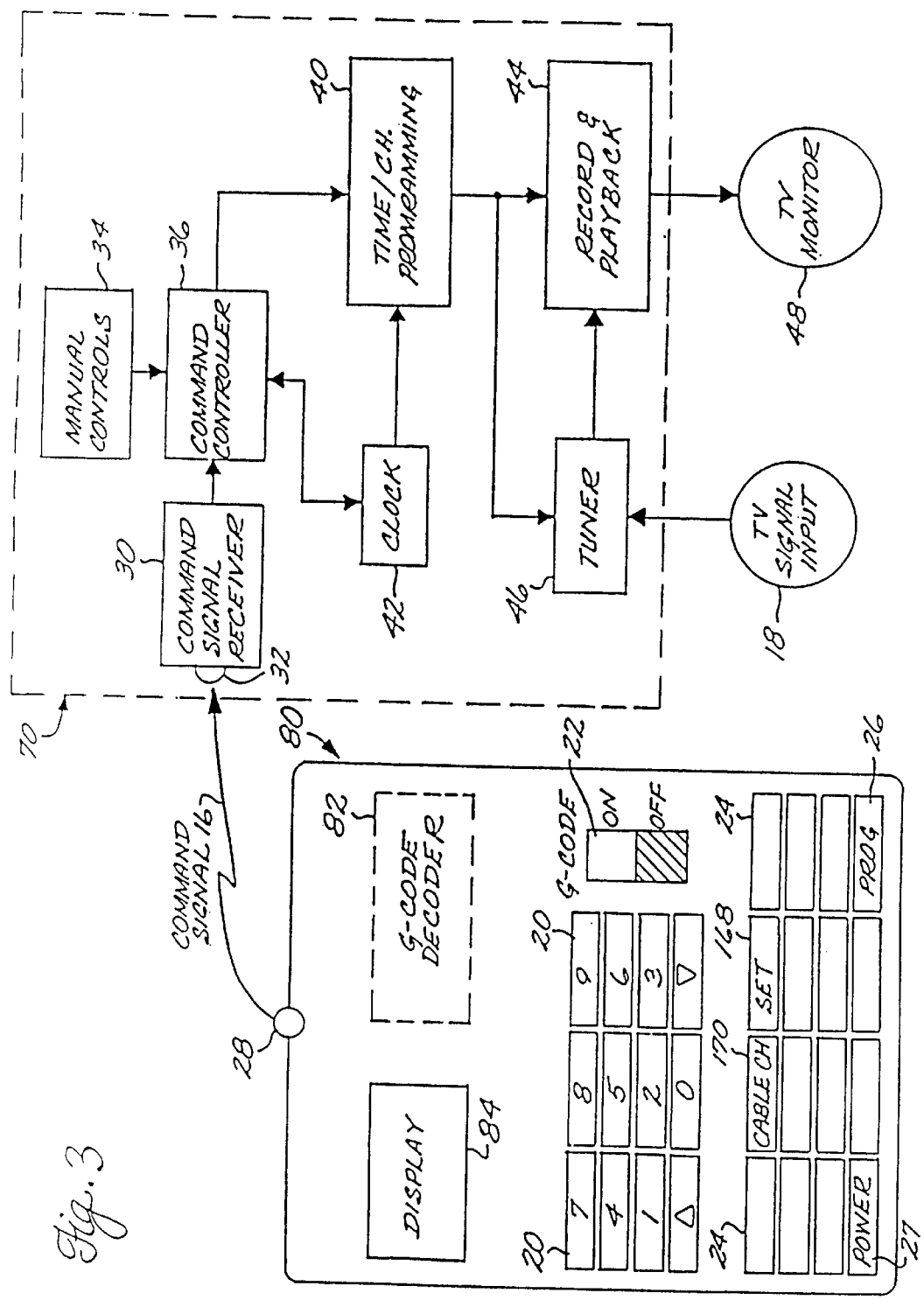
FIG. 3 is a schematic showing the code decoder means embedded in a remote controller, according to an embodiment of the invention.

FIG. 3 illustrates an alternate preferred embodiment of this invention. In FIG. 3 a remote controller with embedded G-code decoder 80 is provided. The remote controller with embedded G-code decoder 80 is very similar to remote controller 12, except for the addition of the G-code decoder 82. Note that it is also possible in any remote controller to provide a display 84. The remote controller with embedded G-code decoder 80 would be used in conjunction with a normal video cassette recorder/player 70, which would not be required to have an embedded G-code decoder. The numerals for the subelements of video cassette recorder/player 70 are the same as described above for the video cassette recorder/player with G-code decoder 14 and have the same function, except for the absence of G-code decoder 38. This preferred embodiment has the advantage that it can be used in conjunction with VCRs that are presently being used. These do not have a G-code decoding capability. Replacing their remote controllers with ones that have this capability built-in can vastly improve the capability to do timer preprogramming for a modest cost.

Figure 4:
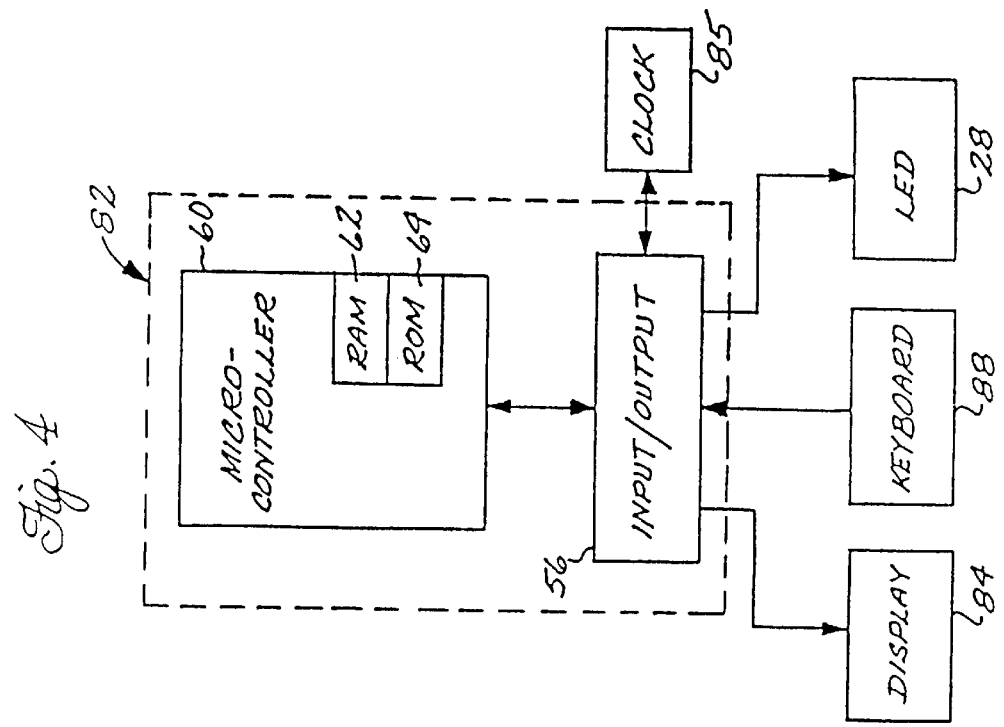
FIG. 4 is a schematic of the processor embedded in the remote controller, according to an embodiment of the invention.

FIG. 4 illustrates a possible realization of the G-code decoder 82 built into the remote controller with embedded G-code decoder 80. A microprocessor 60 can be used as before to decode the G-code, as well as interface with the display 84, a clock 85, the keypad 88 and the light emitting diode 28. Alternately, other hardware implementations can be used to perform the G-code decoding. The clock 85 is provided in the remote controller 80 so that the G-code decoder 82 can be made to have the clock 85 as one of its inputs. This allows the G-code decoding to be a function of the clock 85, which lends a measure of security to the decoding technique and makes it harder to copy.

The remote controller with embedded G-code decoder as described above would send channel, date, time and length information to the video cassette recorder/player 70, which would use the CDTL information for tuning into the correct channel and starting and stopping the recording function. The remote controller may have to be unique for each different video cassette recorder/player, because each brand or model may have different infrared pulses for each type of information sent such as the channel number keys and start record and stop record keys. The particular infrared pulses used for each key type can be called the vocabulary of the particular remote controller. Each model may also have a different protocol or order of keys that need to be pushed to accomplish a function such as timer preprogramming. The protocol or order of keys to accomplish a function can be called sentence structure. If there is a unique remote controller built for each model type, then the proper vocabulary and sentence structure can be built directly into the remote controller.

An alternate to having the remote controller with embedded G-code decoder send channel, date, time and length information to the video cassette recorder/player 70, is to have the remote controller with embedded G-code decoder perform more operations to simplify the interfacing problem with existing video cassette recorder/players. In particular, if the remote controller not only performs the G-code decoding to CDTL, but also keeps track of time via clock 85, then it is possible for the remote controller to send just channel, start record and stop commands to the video cassette recorder/player. The channel, start and stop are usually basic one or two key commands, which means there is no complicated protocol or sentence structure involved. Thus, to communicate with a diverse set of video cassette recorder/player models it is only necessary to have memory within the remote controller, such as ROM 64 of FIG. 4, for storing the protocol for all the models or at least a large subset. The G-code would be entered on the remote controller as before and decoded into channel, date, time and length information, which would be stored in the remote controller. Via clock 85, the time would be checked and when the correct time arrives the remote controller would automatically send out commands to the VCR unit for tuning to the correct channel and for starting and stopping the recording. It is estimated that only two (2) bytes per key for about 15 keys need to be stored for the vocabulary for each video cassette recorder/player model. Thus, to cover 50 models would only require about 30*50=1500 bytes of memory in the remote controller. It would be necessary to position the remote controller properly with respect to the VCR unit so that the infrared signals sent by the remote controller are received by the unit.

Figure 5:
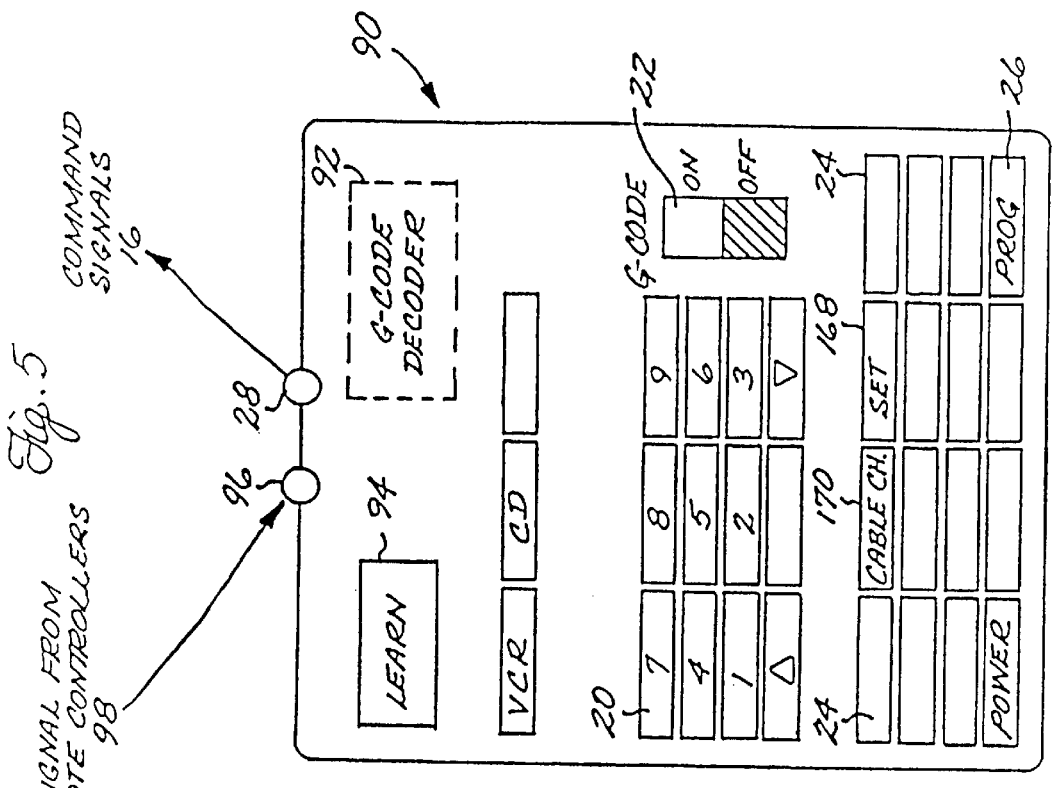
FIG. 5 is a schematic of a universal remote controller with the code decoder means embedded in the universal remote controller, according to an embodiment of the invention.

Another embodiment is to provide a universal remote controller 90 with an embedded G-code decoder. Universal remote controllers provide the capability to mimic a number of different remote controllers. This reduces the number of remote controllers that a user needs to have. This is accomplished by having a learn function key 94 function on the universal remote controller, as shown in FIG. 5. If the learn function key 94 is pushed in conjunction with another key, the unit will enter into the learn mode. Incoming infra-red (IR) pulses from the remote controller to be learned are detected by the infra-red photodiode 96, filtered and wave-shaped into recognizable bit patterns before being recorded by a microcontroller into a battery-backed static RAM as the particular IR pulse pattern for that particular key. This is done for all the individual keys.

An example of more complex learning is the following. If the learn function key 94 in conjunction with the program key 26 are pushed when the G-code switch is "ON", the unit will recognize that it is about to record the keying sequence of a predetermined specific example of timer preprogramming of the particular VCR involved. The user will then enter the keying sequence from which the universal remote controller 90 can then deduce and record the protocol of the timer preprogramming sequence. This is necessary because different VCRs may have different timer preprogramming command formats.

If keys are pushed without the learn function key 94 involved, the microcontroller should recognize it is now in the execute mode. If the key is one of the direct command keys, the microcontroller will read back from its static RAM the stored pulse sequence and send out command words through the output parallel I/O to pulse the output light emitting diode 28. If the key is the PROG key and the G-code switch is "OFF", then the microcontroller should recognize the following keys up to the next PROG key as a timer preprogramming CDTL command and send it out through the light emitting diode 28. If the G-code switch 22 is set to "ON" and the program key 26 is pushed, the microcontroller should recognize the following keys up to the next PROG key as a G-code command for timer preprogramming. It will decode the G-code into channel, date, start time and length (CDTL) and the microcontroller will then look up in it's static RAM "dictionary" the associated infra-red pulse patterns and concatenate them together before sending them off through the output parallel I/O to pulse the light emitting diode 28 to send the whole message in one continuous stream to the VCR.

FIG. 4 illustrates a possible realization of the G-code decoder 92 that could be built into the universal remote controller with embedded G-code decoder 90. A microcontroller 60 can be used as before to decode the G-code, as well as for interfacing with the input/output functions including the photodiode 96. Alternately, the G-code decoding can be performed with other hardware implementations.

The universal remote controller can also be used in another manner to simplify the interfacing problem with existing video cassette recorder/players. In particular, if the universal remote controller performs not only the G-code decoding to CDTL, but also keeps track of time via clock 85 in FIG. 4, then it is possible for the universal remote controller to send just channel, start record and stop commands to the video cassette recorder/player, which as explained before, are usually basic one key commands, which means there is no complicated protocol or sentence structure involved. Thus, to communicate with a diverse set of video cassette recorder/player models it is only necessary for the universal remote controller to "learn" each key of the remote controller it is replacing. The G-code would be entered on the universal remote controller as before and decoded into channel, date, time and length information, which would be stored in the universal remote controller. Via clock 85, the time would be checked and when the correct time arrives the universal remote controller would automatically send out commands to the VCR unit for tuning to the correct channel and for starting and stopping the recording. It would be necessary to position the universal remote controller properly with respect to the VCR unit so that the signals sent by the universal remote are received by the VCR unit.

There are a number of ways that the G-code decoding can be performed. The most obvious way is to just have a large look up table. The G-code would be the index. Unfortunately, this would be very inefficient and result in a very expensive decoder due to the memory involved. The total storage involved is a function of the number of total combinations. If we allow for 128 channels, 31 days in a month, 48 on the hour and on the half hour start times in a twenty four hour day, and 16 length selections in half hour increments, then the total number of combinations is 128×31×48×16=3,047,424. This number of combinations can be represented by a 7 digit number. The address to the table would be the 7 digit number. In the worse case, this requires a look-up table that has about 4,000,000 rows by 15 to 16 digital columns, depending on the particular protocol. These digital columns would correspond to the CDTL information required for "on screen programming". Each digit could be represented by a 4 bit binary number. Thus, the total storage number of bits required for the look up table would be about 4,000,000×16×4=256,000,000. The present state of the art has about 1 million bits per chip. Thus, G-code decoding using a straightforward table look up would require a prohibitively expensive number of chips.

Fortunately, there are much more clever ways of performing the G-code decoding. FIG. 6 is a flow diagram of a preferred G-code decoding technique. FIG. 7 is the flow chart for the G-code encoding technique. For each program that will be printed in the guide, a channel, date, time and length (CDTL) code 144 is entered in step 142. Step 146 separately reads the priority for the channel, date, time and length in the priority vector storage 122, which can be stored in read only memory 64. The priority vector storage 122 contains four tables: a priority vector C table 124, a priority vector D table 126, a priority vector T table 128 and a priority vector L table 130.

The channel priority table is ordered so that the most frequently used channels have a low priority number. An example of the data that is in priority vector C table 124 follows.

| channel  | 4 | 7 | 2 | 3 | 5 | 6 | 11 | 13 ... |
|----------|---|---|---|---|---|---|----|--------|
| priority | 0 | 1 | 2 | 3 | 4 | 5 | 6  | 7 ...  |

Generally the dates of a month all have an equal priority, so the low number days in a month and the low number priorities would correspond in the priority vector D table as in the following example.

| date     | 1 | 2 | 3 | 4 | 5 | 6 | 7 | 8 | 9 | 10 ... |
|----------|---|---|---|---|---|---|---|---|---|--------|
| priority | 0 | 1 | 2 | 3 | 4 | 5 | 6 | 7 | 8 | 9 ...  |

The priority of the start times would be arranged so that prime time would have a low priority number and programs in the dead of the night would have a high priority number. For example, the priority vector T table would contain:

| time     | 6:30 pm | 7:00 pm | 8:00 pm | 7:30 pm ... |
|----------|---------|---------|---------|-------------|
| priority | 0       | 1       | 2       | 3 ...       |

An example of the data that is in the priority vector L table 130 is the following:

| length of program (hours) | 0.5 | 1.0 | 2.0 | 1.5 | 3.0 ... |
|---------------------------|-----|-----|-----|-----|---------|
| priority                  | 0   | 1   | 2   | 3   | 4 ...   |

Suppose the channel date time length (CDTL) 144 data is 5 10 19.00 1.5, which means channel 5, 10th day of the month, 7:00 PM, and 1.5 hours in length, then for the above example the $C_p, D_p, T_p, L_p$ data 148, which are the result of looking up the priorities for channel, date, time and length in priority tables 124, 126, 128 and 130 of FIG. 7, would be 4 9 1 3. Step 150 converts $C_p, D_p, T_p, L_p$ data to binary numbers. The number of binary bits in each conversion is determined by the number of combinations involved. Seven bits for $C_p$, which can be denoted as $C_7 C_6 C_5 C_4 C_3 C_2 C_1$, would provide for 128 channels. Five bits for $D_p$, which can be denoted as $D_5 D_4 D_3 D_2 D_1$, would provide for 31 days in a month. Six bits for $T_p$, which can be denoted as $T_6 T_5 T_4 T_3 T_2 T_1$, would provide for 48 start times on each half hour of a twenty four hour day. Four bits for length, which can be denoted as $L_4 L_3 L_2 L_1$, would provide for a program length of up to 8 hours in half hour steps. Together there are 7+5+6+4=22 bits of information, which correspond to 2**22=4,194,304 combinations.

The next step is to use bit hierarchy key 120, which can be stored in read only memory 64 to reorder the 22 bits. The bit hierarchy key 120 can be any ordering of the 22 bits. For example, the bit hierarchy key might be:

$L_8 \; C_3 \ldots T_2 \; C_2 \; T_1 \; C_1 \; L_1 \; D_5 \; D_4 \; D_3 \; D_2 \; D_1$ 22 21 ... 10 9 8 7 6 5 4 3 2 1

Ideally the bit hierarchy key is ordered so that programs most likely to be the subject of timer preprogramming would have a low value binary number, which would eliminate keystrokes for timer preprogramming the most popular programs. Since all the date information has equal priority, then the $D_5 \; D_4 \; D_3 \; D_2 \; D_1$ bits are first. Next $T_1 \; C_1 \; L_1$ are used, because for whatever date it is necessary to have a time channel and length and $T_1 \; C_1 \; L_1$ are the most probable in each case due to the ordering of the priority vectors in priority vector storage 122. The next bit in the hierarchy key is determined by the differential probabilities of the various combinations. One must know the probabilities of all the channels, times and lengths for this calculation to be performed.

For example, the probability for channels may be:

| channel | 4 | 7 | 2 | 3 | 5 | 6 | 11 | 13 ... |
|---|---|---|---|---|---|---|---|---|
| priority | 0 | 1 | 2 | 3 | 4 | 5 | 6 | 7 ... |
| probability (%) | 5 | 4.3 | 4 | 3 | 2.9 | 2.1 | 2 | 1.8 ... |

The probabilities for times might be:

| time | 6:30 pm | 7:00 pm | 8:00 pm | 7:30 pm ... |
|---|---|---|---|---|
| priority | 0 | 1 | 2 | 3 ... |
| probability (%) | 8 | 7.8 | 6 | 5 ... |

And, the probabilities for lengths might be:

| length of program (hours) | 0.5 | 1.0 | 2.0 | 1.5 | 3.0 ... |
|---|---|---|---|---|---|
| priority | 0 | 1 | 2 | 3 | 4 ... |
| probability (%) | 50 | 20 | 15 | 5 | 4 ... |

The probabilities associated with each channel, time and length, as illustrated above, are used to determine the proper ordering. Since the priority vector tables are already ordered by the most popular channel, time, and length, the order in which to select between the various binary bits for one table, for example selecting between the $C_7 \; C_6 \; C_5 \; C_4 \; C_3 \; C_2 \; C_1$ bits, is already known. The $C_1$ bit would be selected first because as the lowest order binary bit it would select between the first two entries in the channel priority table. Then the $C_2$ bit would be selected and so on. Similarly, the $T_1$ and $L_1$ bits would be used before any of the other time and length bits. A combination of the $C_1, T_2, L_1$ and $D_5 \; D_4 \; D_3 \; D_2 \; D_1$ bits should be used first, so that all the information is available for a channel, date, time and length. The $D_5 \; D_4 \; D_3 \; D_2 \; D_1$ bits are all used because the date bits all have equal priority and all are needed to specify a date even if some of the bits are binary zero.

At this point the bit hierarchy key could be:

$T_1 \; C_1 \; L_1 \; D_5 \; D_4 \; D_3 \; D_2 \; D_1$

The first channel binary bit $C_1$ by itself can only select between $2^1=2$ channels, and the first two channels have a probability percent of 5 and 4.3, respectively. So the differential probability of $C_1$ is 9.3. Similarly, the differential probability of $T_1$ is 8+7.8=15.8, and the differential probability of $L_1$ is 50+20=70. If the rules for ordering the bit hierarchy key are strictly followed, then the first 8 bits of the bit hierarchy key should be ordered as:

$C_1 \; T_1 \; L_1 \; D_5 \; D_4 \; D_3 \; D_2 \; D_1,$ because $L_1$ has the highest differential priority so it should be next most significant bit after $D_5$, followed by $T_1$ as the next most significant bit, and then $C_1$ as the next most significant bit. Notice that the bit hierarchy key starts with the least significant bit $D_1$, and then is filled in with the highest differential probability bits. This is for the purpose of constructing the most compact codes for popular programs.

The question at this point in the encoding process is what should the next most significant bit in the hierarchy key be: $T_2, C_2,$ or $L_2$. This is again determined by the differential probabilities, which can be calculated from the above tables for each bit. Since we are dealing with binary bits, the $C_2$ in combination with $C_1$ selects between $2^2=4$ channels or 2 more channels over $C_1$ alone. The differential probability for $C_2$ is then the additional probabilities of these two additional channels and for the example this is: 4+3=7. In a similar manner $C_3$ in combination with $C_1$ and $C_2$ selects between $2^3=8$ channels or $4=2^{(3-1)}$ more channels over the combination of $C_1$ and $C_2$. So the differential probability of $C_3$ is the additional probabilities of these four additional channels and for the example this is: 2.9+2.1+2+1.8=8.8. In a similar manner, the differential probabilities of $T_2$ and $L_2$ can be calculated to be 6+5=11 and 15+5=20, respectively. Once all the differential probabilities are calculated, the next step is determining which combinations of bits are more probable.

Now for the above example, which combination is more probable: $T_2$ with $C_1 \; L_1$, or $C_2$ with $T_1 \; L_1$, or $L_2$ with $T_1 \; C_1$. This will determine the next bit in the key. So, which is greater: $11 \times 9.3 \times 70 = 7161$; $7 \times 15.8 \times 70 = 7742$; or $20 \times 15.8 \times 9.3 = 2938.8$? In this case the combination with the greatest probability is $7 \times 15.8 \times 70 = 7742$, which corresponds to $C_2$ with $T_1 \; L_1$. So, $C_2$ is selected as the next bit in the bit hierarchy key.

The next bit is selected in the same way. Which combination is more probable: $C_3$ with $T_1 \; L_1$, or $T_2$ with $C_1$ or $C_2$ and $L_1$, or $L_2$ with $C_1$ or $C_2$ and $T_1$. For the example shown, which has the greatest probability: $8.8 \times 15.8 \times 70 = 9732.8$; $11 \times (9.3+7) \times 70 = 12551$; or $20 \times (9.3+7) \times 15.8 = 5150.8$? In this case the combination with the greatest probability is $11 \times (9.3+7) \times 70 = 12551$, which corresponds $T_2$ with $C_1$ or $C_2$ and $L_1$. So, $T_2$ is selected as the next bit in the bit hierarchy key. This procedure is repeated for all the differential probabilities until the entire key is found.

Alternately, the bit hierarchy key can be just some arbitrary sequence of the bits. It is also possible to make the priority vectors interdependent, such as making the length priority vector dependent on different groups of channels. Another technique is to make the bit hierarchy key 120 and the priority vector tables 122, a function of clock 42, as shown in FIG. 7. This makes it very difficult for the key and therefore the coding technique to be duplicated or copied.

For example it is possible to scramble the date bits in the bit hierarchy key 120 as a function of the clock. Changing the order of the bits as a function of the clock would not change the effectiveness of the bit hierarchy key in reducing the number of binary bits for the most popular programs, because the date bits all are of equal priority. This could be as simple as switching the $D_1$ and $D_5$ bits periodically, such as every day or week. Thus the bit hierarchy key 120 would switch between $C_1 \; T_1 L_1 \; D_5 \; D_4 \; D_3 \; D_2 \; D_1$ and $C_1 \; T_1 L_1 \; D_1 \; D_4 \; D_3 \; D_2 \; D_5.$ Clearly other permutations of the bit hierarchy key as a function of the clock are possible.

The priority vector tables could also be scrambled as a function of the clock. For example, the first two channels in the priority channel table could just be swapped periodically. If this technique is followed, then the $C_p$ of 148 in FIG. 7 would change as a function of the clock 42. For example, channel 4 7 2 3 5 6 11 13
priority 0 1 2 3 4 5 6 7 would change periodically to:

channel 7 4 2 3 5 6 11 13
priority 0 1 2 3 4 5 6 7

This would be a fairly subtle security technique, because a decoder that was otherwise correct would only fail if those first two channels were being used. Other clock dependencies are also possible to provide security for the coding technique.

However it is derived, the bit hierarchy key 120 is determined and stored. In step 154 the binary bits of $C_p, D_p, T_p, L_p$ are rearranged according to the bit hierarchy key 120 to create one 22 bit binary number. Then the resulting 22 bit binary number is converted to decimal in the convert binary number to decimal G-code step 156. The result is G-code 158.

If the priority vector and the bit hierarchy key are well matched to the viewing habits of the general population, then it is expected that the more popular programs would require no more than 3 or 4 digits for the G-code.

Now that the encoding technique has been explained the decoding technique is just reversing the coding technique. This is done according to the flow chart of FIG. 6. This is the preferred G-code decoding that can be built into G-code decoder 38 in VCR 14 or the remote controller G-code decoders 82 and 92 in FIGS. 3 and 5.

The first step 102 is to enter G-code 104. Next the G-code 104 is converted to a 22 bit binary number in step 106. Then the bits are reordered in step 108 according to the bit hierarchy key 120 to obtain the reordered bits 110. Then the bits are grouped together and converted to decimal form in step 112. As this point we obtain $C_p, D_p, T_p, L_p$ data 114, which are the indices to the priority vector tables. For the above example, we would have at this step the vector 4 9 1 3. This $C_p, D_p, T_p, L_p$ data 114 is then used in step 116 to look up channel, date, time, and length in priority vector storage 122. The CDTL 118 for the example above is 5 10 19.00 1.5, which means channel 5, 10th day of the month, 7:00 PM, and 1.5 hours in length.

If the coding technique is a function of the clock then it is also necessary to make the decoding technique a function of the clock. It is possible to make the bit hierarchy key 120 and the priority vector tables 122, a function of clock 42, as shown in FIG. 6. This again makes it very difficult for the key and therefore the coding technique to be duplicated or copied. It is also possible to have the decoding and encoding techniques dependent on any other predetermined or pre-programmable algorithm.

Although the above G-code encoding and decoding technique is a preferred embodiment, it should be understood that there are many ways to perform the intent of the invention which is to reduce the number of keystrokes required for timer preprogramming. To accomplish this goal there are many ways to perform the G-code encoding and decoding. There are also many ways to make the encoding and decoding technique more secure besides just making the encoding and decoding a function of the clock. This security can be the result of any predetermined or preprogrammed algorithm.

It is possible in the G-code coding and decoding techniques to use mixed radix number systems instead of binary numbers. For example, suppose that there are only 35 channels, which would require 6 binary bits to be represented; however, 6 binary bits can represent 64 channels, because $2^6=64$. The result is that in a binary number system there are 29 unnecessary positions. This can have the effect of possibly making a particular G-code longer than it really needs to be. A mixed radix number system can avoid this result. For example, for the case of 35 channels, a mixed radix number system with the factors of $7^1$ and $5^0$ can represent 35 combinations without any empty space in the code. The allowed numbers for the $7^1$ factor are 0, 1, 2, 3, and 4. The allowed numbers for the $5^0$ factor are 0, 1, 2, 3, 4, 5, and 6. For example, digital 0 is represented in the mixed radix number system as 00. The digital number 34 is represented in the mixed radix number system as 46, because $4*7^1+6*5^0=34$. The major advantage of a mixed radix number system is in prioritizing the hierarchy key. If the first 5 channels have about equal priority and the next 30 are also about equal, then the mixed radix number system allows the two tiers to be accurately represented. This is not to say that a mixed radix number system is necessarily preferable. Binary numbers are easier to represent in a computer and use of a fixed radix number system such as binary numbers allows a pyramid of prioritization to be easily represented in the hierarchy key.

Another feature that is desirable in all of the embodiments is the capability to key in the G-code once for a program and then have the resulting CDTL information used daily or weekly. Ordinarily the CDTL information is discarded once it is used. In the case of daily or weekly recording of the same program, the CDTL information is stored and used until it is cancelled. The desire to repeat the program daily or weekly can be performed by having a "WEEKLY" or "DAILY" button on the remote controller or built into the VCR manual controls. Another way is to use one key, such as the PROG key and push it multiple times within a certain period of time such as twice to specify daily or thrice to specify weekly. For example, if the G-code switch is "ON" and the G-code for the desired program is 99 then daily recording of the program can be selected by the following keystrokes:

"PROG 99 DAILY PROG"

or by:

"PROG 99 PROG PROG".

The G-code 99 would be converted to CDTL information, which would be stored and used daily in this case. The recording would begin on the date specified and continue daily after that using the same channel time and length information. A slight twist is that daily recording could be automatically suspended during the weekends, because most daily programs are different on Saturday and Sunday.

Once a daily or weekly program is set up, then it can be used indefinitely. If it is desired to cancel a program and if there is a "CANCEL" button on the remote controller or manual control for the VCR, then one way to cancel a program (whether it is a normal CDTL, daily or weekly entry) is to key in the following:

"PROG xx CANCEL", where xx is the G-code.

Again as before there are alternate ways of accomplishing this.

If "on screen programming" is available, then the programs that have been selected for timer preprogramming could be reviewed on the screen. The daily and weekly programs would have an indication of their type. Also the G-codes could be displayed along with the corresponding CDTL information. This would make it quite easy to review the current "menu" and either add more programs or cancel programs as desired.

A television calendar 200 according to this invention is illustrated in FIG. 8. As shown, the television calendar has multiple day of year sections 202, multiple day sections 204, multiple time of day sections 206, channel identifiers 208, and descriptive program identifiers 210, including the name of the program, arranged in a manner that is common in television guide publications. Arranged in relation to each channel identifier is a compressed code indication 212 or G-code containing the channel, date, time and length information for that entry in the television calendar. FIG. 8 shows how easy it is to perform timer programming. All one needs to do is find the program one wants to watch and enter the compressed code shown in the compressed code indication. This is in contrast to having to deal with all the channel, date, time and length entries separately. At least the channel, date and time are explicitly stated in the television guide. The length is usually only available by searching the guide to find the time of day section 204 where a new program begins and then performing some arithmetic to find the length of the program. Using the compressed G-code avoids all these complications.

Other features related to compressed G-codes and cable television programs are in patent application Ser. No. 07/829,412.

An embodiment of an apparatus for using compressed codes for recorder preprogramming is the instant programmer 300 of FIG. 9. The instant programmer 300 has number keys 302, which are numbered 0 through 9, a CANCEL key 304, a REVIEW key 306, a WEEKLY key 308, a ONCE key 310 and a DAILY (M–F) key 312, which are used to program the instant programmer 300. A lid normally covers other keys, which are used to setup the instant programmer 300. When lid 314 is lifted, the following keys are revealed: SAVE key 316, ENTER key 318, CLOCK key 320, CH key 322, ADD TIME key 324, VCR key 326, CABLE key 328, and TEST key 330. Other features of instant programmer 300 shown on FIG. 9 are: liquid crystal display 350 and red warning light emitting diode 332. The front elevation view FIG. 10 of instant programmer 300 shows front infrared (IR) diode 340 mounted on the front side 338. The instant programmer 300 is placed near the equipment to be programmed such as a video cassette recorder.

Other features and embodiments of the instant programmer 300 are described in patent application Ser. No. 07/829, 412.

Figure 11:
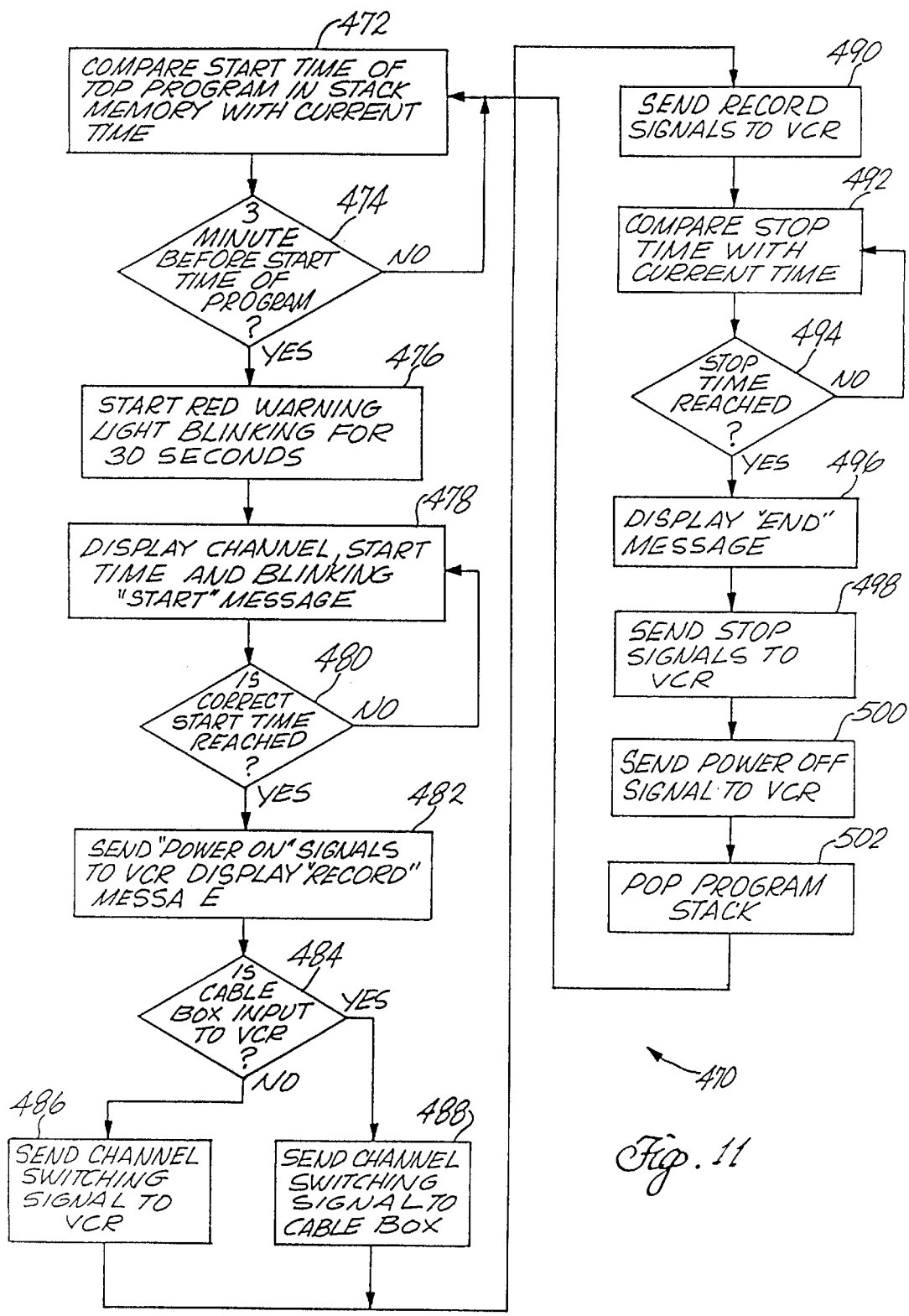
FIG. 11 is a flow graph for executing recorder preprogramming using compressed codes according to an embodiment of the invention.

FIG. 11 is a flowchart for automatically recording a program and consists of the following steps: compare start time of top program in stack memory with current time step 472; test if three minutes before start time of program step 474; start red warning LED 332 blinking for 30 seconds step 476; display channel, start time and blinking "START" message step 478, is correct start time reached step 480 and send power ON signal to VCR and display "REC" message step 482; test if a cable box is input to VCR step 484, send channel switching signals to VCR step 486 and send channel switching signals to cable box step 488; send record signals to VCR step 490; compare stop time with current time step 492, test if stop time reached step 494 and display "END" message step 496; send stop signals to VCR step 498; send power OFF signal to VCR step 500; and pop program stack step 502.

The decoding means can be embedded into various appliances, such as a television, a video cassette recorder, a cable box or a satellite receiver. In any system the decoding means would have to be present in only one of the equipments, such as the cable box, which would then at the appropriate time distribute the proper commands to the other equipments such as a VCR and a satellite receiver to record the desired program.

Figure 12:
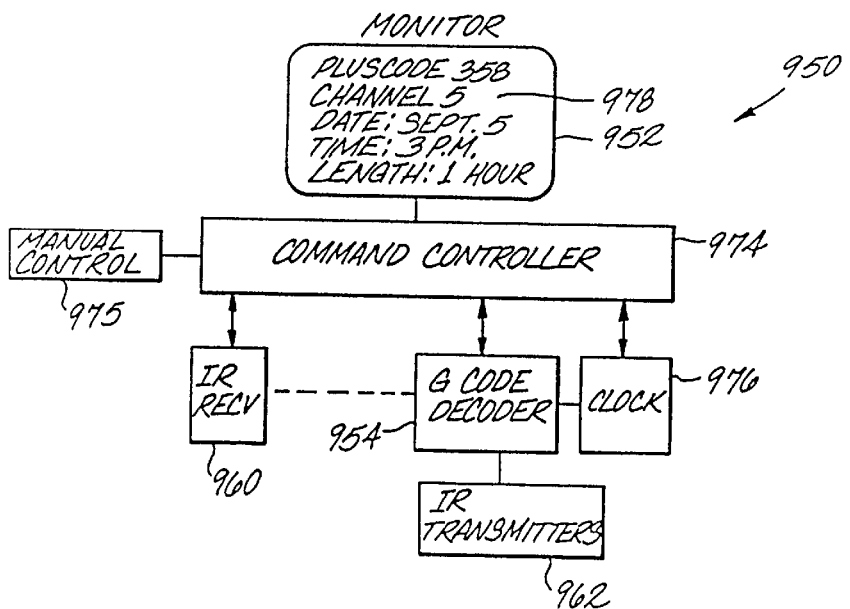
FIG. 12 is a schematic of a television having a G-code decoder, according to an embodiment of the invention.

FIG. 12 is a schematic of a television receiver having a G-code decoder. The television receiver with G-code decoder 950 would receive signals from a remote controller via infrared receiver 960, which would send the signals to either command controller 974 or directly to G-code decoder 954. The command controller 974 may be present in the television receiver to control other items in the television, including "on screen" functions such as displaying the channel number when the channel is changed. The G-code decoder 954 would decode a sent G-code and using the date and time from clock 976 would send the proper commands to a VCR and a cable box via infrared transmitters 962. The G-codes and other commands could also be sent to the command controller via manual control 975. When the G-code is decoded, then the G-code and the decoded CDTL information could be displayed "on screen" as shown in on screen display 978 on television display/monitor 952. The "on screen" display is not necessary and any format is optional.

Figure 13:
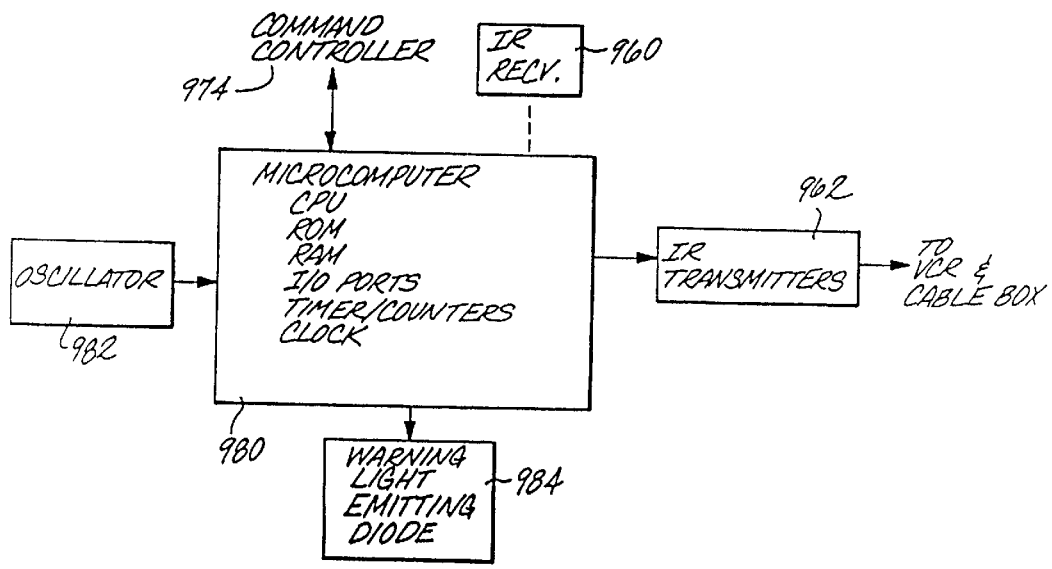
FIG. 13 is a schematic showing apparatus for a G-code decoder in a television having G-code decoding, according to an embodiment of the invention.

FIG. 13 is a schematic showing apparatus for a G-code decoder in a television receiver having G-code decoding.

Figure 14:
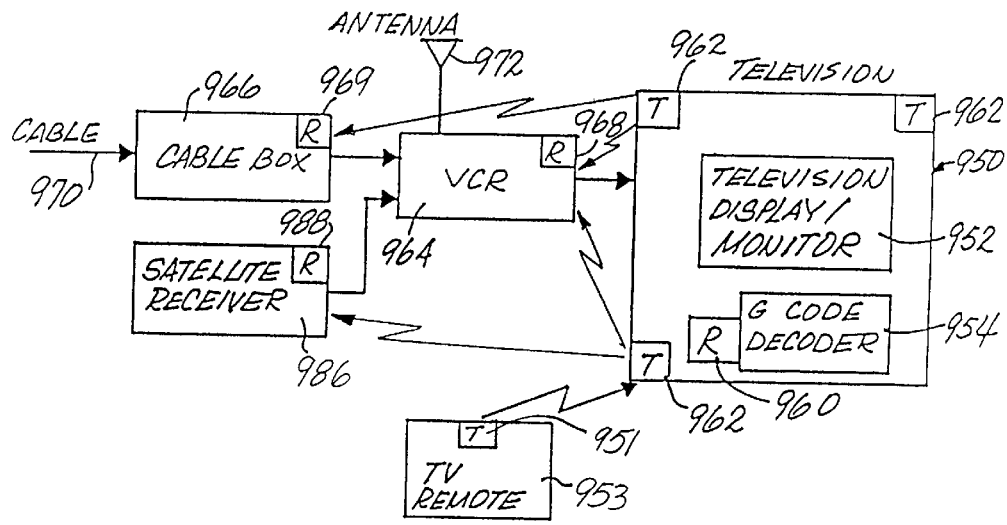
FIG. 14 is a block diagram of a system including a television having a G-code decoder, a VCR, a cable box and a satellite receiver, according to an embodiment of the invention.

FIG. 14 is a block diagram of a system including a television having a G-code decoder 950, a VCR 964, a cable box 966 and a satellite receiver 986. The user would use the television remote controller 953, which could be a universal remote controller or controls on the television receiver to enter the code that signifies the program to be recorded. The same television remote and controls on the television would also be used to perform normal television control functions, such as channel selection. When a G-code is entered, the television remote would send the G-code to the television with G-code decoder 950 via infrared transmitter 951. An infrared receiver 960 on the television receiver 950 would receive the transmission and send the code to the G-code decoder 954, which would decode the code into CDTL and use this information along with a clock, which would also be embedded in the television receiver 950, to send the proper commands to the VCR 964 and cable box 966 at the appropriate time so that the selected program will be recorded at the proper time. The transmission from the television 950 would be via infrared transmitters 962, which can be placed at strategic points on the television cabinet, such as at the corners. The transmission is then received by the VCR 964 via infrared receiver 968 and the cable box 966 via infrared receiver 969. A satellite receiver 986 is included, which can receive commands via infrared receiver 988. The commands received by the satellite receiver include on/off commands and channel select commands. The satellite receiver 986 feeds a television signal to VCR 964, which can record the program and/or relay it to television display/monitor 952.

Figure 15:
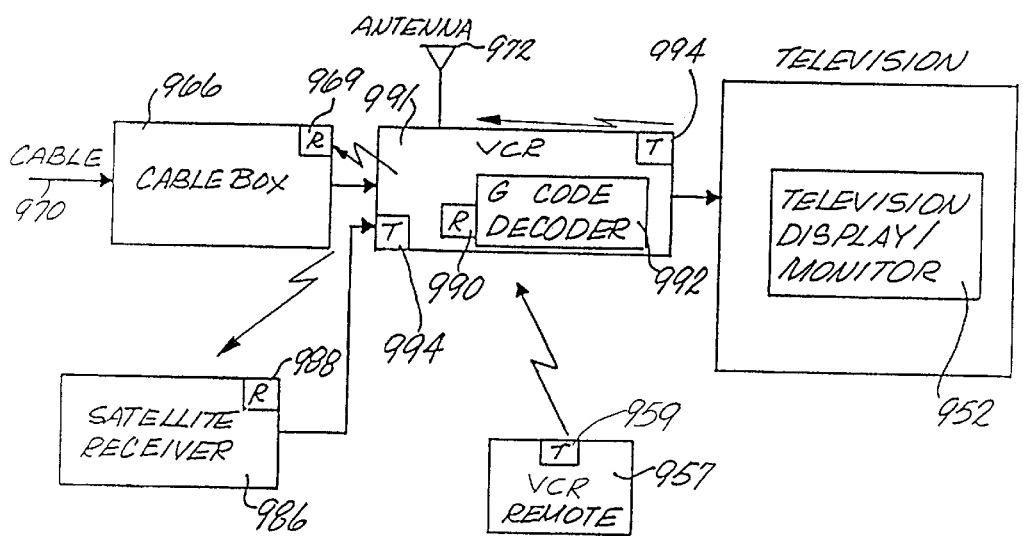
FIG. 15 is a block diagram of a system including a VCR having a G-code decoder, a television, a cable box and a satellite receiver, according to an embodiment of the invention.

FIG. 15 is a block diagram of a system including a VCR having a G-code decoder 991, a television 952, a cable box 966 and a satellite receiver 986. The user would use the VCR remote controller 957 or controls on the VCR 991 to enter the code that signifies the program to be recorded. The VCR remote controller 957 can be a universal remote controller. When a G-code is entered, the VCR remote controller would send the G-code to VCR 991 with G-code decoder 992 via infrared transmitter 959. An infrared receiver 990 on the VCR 991 would receive the transmission and send the code to the G-code decoder 992, which would decode the code into CDTL and use this information along with a clock, which would also be embedded in the VCR 991, to send the proper commands to the cable box 966 and the satellite receiver 986 at the appropriate time so that the selected program will be recorded at the proper time. The transmission from the VCR 991 would be via infrared transmitters 994, which can be placed at strategic points on the VCR. The transmission is then received by the cable box 966 via infrared receiver 969 and the satellite receiver 986 via infrared receiver 988.

Figure 16:
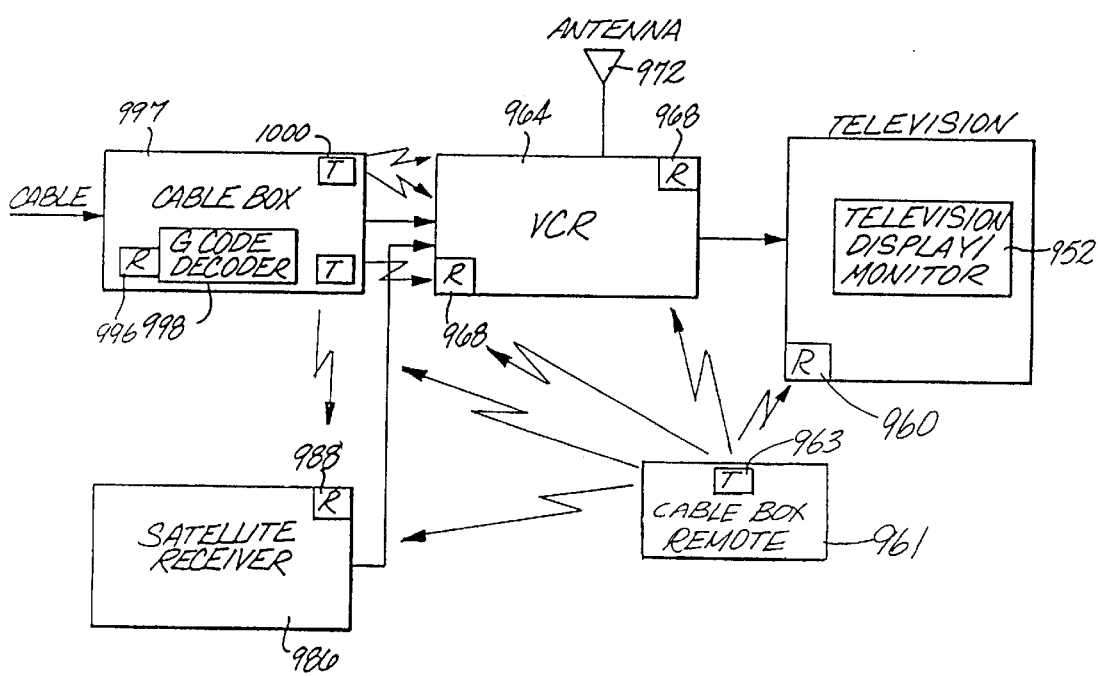
FIG. 16 is a block diagram of a system including a cable box having a G-code decoder, a television, a VCR, and a satellite receiver, according to an embodiment of the invention.

FIG. 16 is a block diagram of a system including a cable box having a G-code decoder 997, a television 952, a VCR 964, and a satellite receiver 986. The user would use the cable box remote controller 961 or controls on the cable box 997 to enter the code that signifies the program to be recorded. The cable box remote controller 961 can be a universal remote controller. When a G-code is entered, the cable box remote controller would send the G-code to cable box 997 with G-code decoder 998 via infrared transmitter 963. An infrared receiver 996 on the cable box 997 would receive the transmission and send the code to the G-code decoder 998, which would decode the code into CDTL and use this information along with a clock, which would also be embedded in the cable box 997, to send the proper commands to the VCR 964 and the satellite receiver 986 at the appropriate time so that the selected program will be recorded at the proper time. The transmission from the cable box 997 would be via infrared transmitters 1000, which can be placed at strategic points on the cable box. The transmission is then received by the VCR 964 via infrared receiver 968 and the satellite receiver 986 via infrared receiver 988.

Figure 17:
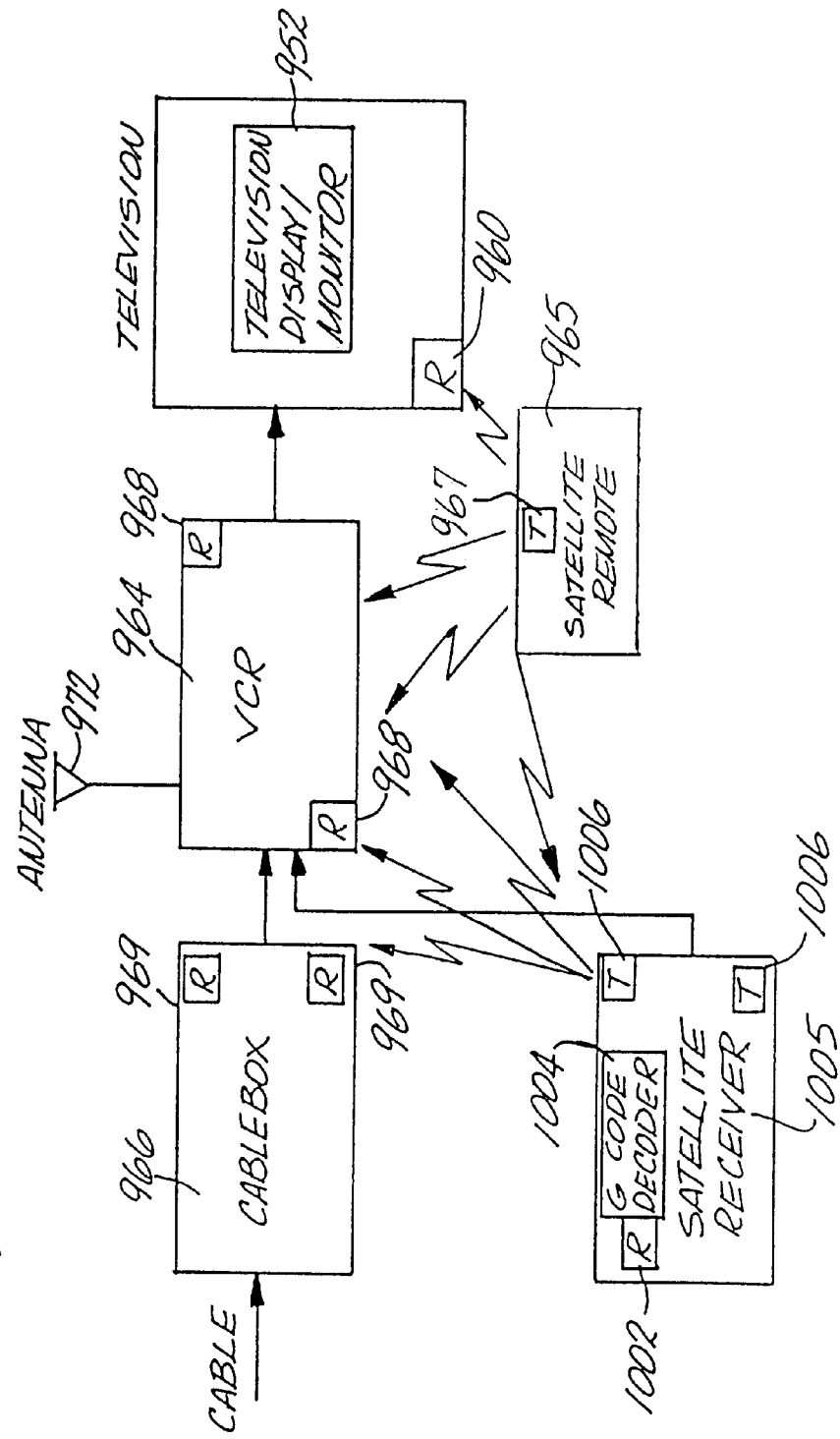
FIG. 17 is a block diagram of a system including a satellite receiver having a G-code decoder, a television, a VCR, and a cable box, according to an embodiment of the invention.

FIG. 17 is a block diagram of a system including a satellite receiver 1005 having a G-code decoder, a television 952, a VCR 964, and a cable box 966. The user would use the satellite remote controller 965 or controls on the satellite receiver 1005 to enter the code that signifies the program to be recorded. The satellite remote controller can be a universal remote controller. When a G-code is entered, the satellite remote controller would send the G-code to satellite receiver 1005 with G-code decoder 1004 via infrared transmitter 967. An infrared receiver 1002 on the satellite receiver 1005 would receive the transmission and send the code to the G-code decoder 1004, which would decode the code into CDTL and use this information along with a clock, which would also be embedded in the satellite receiver 1005, to send the proper commands to the VCR 964 and the cable box 966 at the appropriate time so that the selected program will be recorded at the proper time. The transmission from the satellite receiver 1005 would be via infrared transmitters 1006, which can be placed at strategic points on the satellite receiver. The transmission is then received by the VCR 964 via infrared receiver 968 and the cable box 966 via infrared receiver 969.

Figure 18:
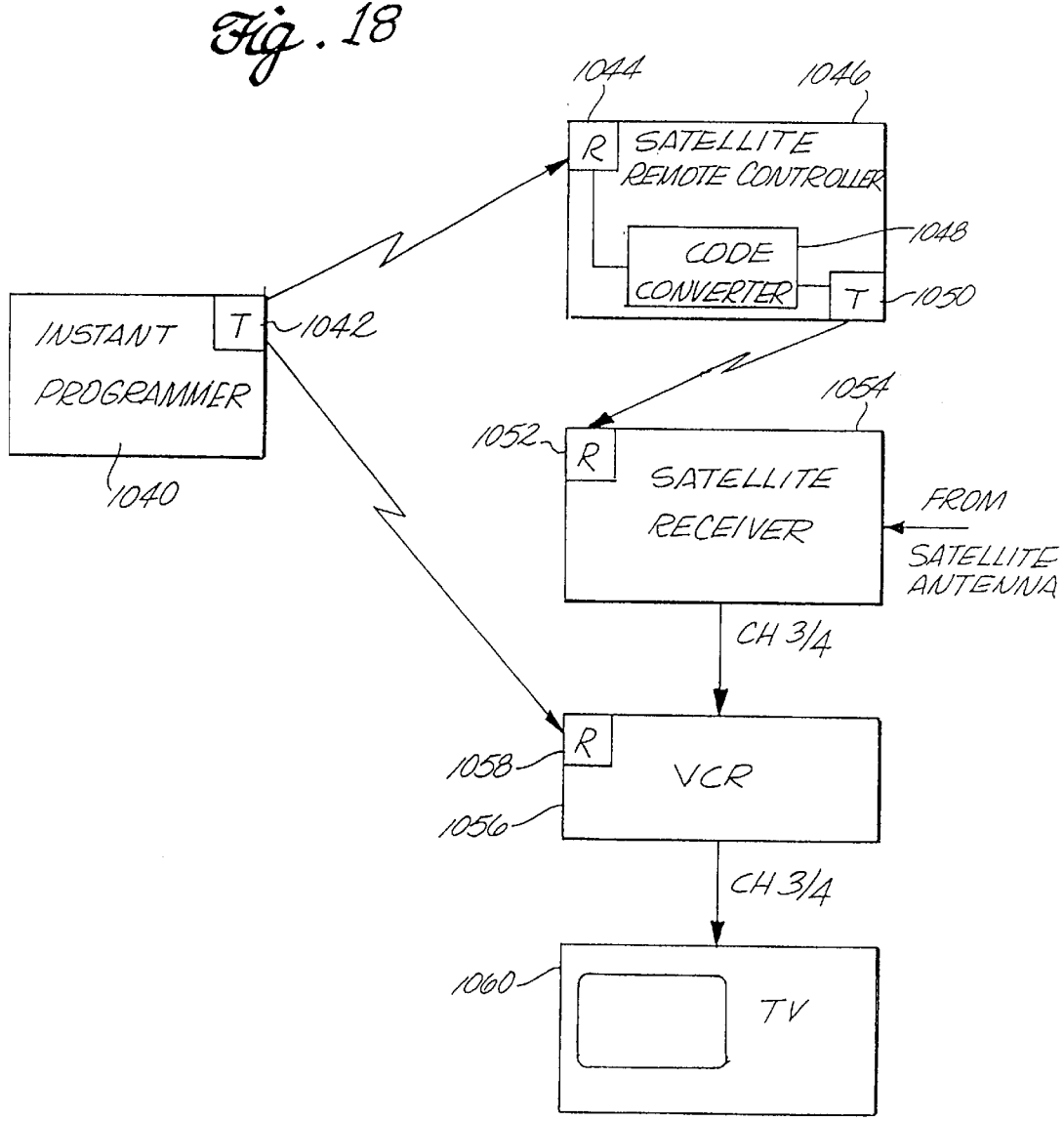
FIG. 18 is a block diagram of a system including an instant programmer, a satellite receiver, a satellite remote controller having a code converter and infrared communication to the satellite receiver, a VCR and a television, according to an embodiment of the invention.

Another embodiment is shown in FIG. 18, which includes an instant programmer 1040, a satellite receiver 1054, a satellite remote controller 1046 having a code converter 1048, a VCR 1056 and a television 1060. In this system the instant programmer 1040 operates in the same manner as the instant programmer 300 of FIG. 9. The instant programmer 1040 is setup to send commands using otherwise unused infrared codes (predetermined as unused cable box or VCR codes) via infrared transmitter 1042 to the infrared receiver 1044 on satellite remote controller 1046. The commands sent by the instant programmer 1040 and received by the satellite remote controller 1046 can include on/off commands and channel select commands. These on/off commands and channel select commands are intended for the satellite receiver 1054; however, before the commands are sent from the satellite remote controller 1046 to the satellite receiver 1054, the commands received by infrared receiver 1044 are converted by code converter 1048 to satellite receiver codes recognizable by satellite receiver 1054. The inclusion of a code converter 1048 in the satellite remote controller 1046 allows an instant programmer 1040 that is not capable of direct communication with the satellite receiver 1054 to be used to command turning on and off the satellite receiver and to command channel selection in the satellite receiver. The code converter can be implemented by a microcomputer and/or by looking up the code conversions in a table built into the satellite remote controller 1046. The commands converted into satellite receiver codes are sent to the satellite receiver 1054 via infrared transmitter 1050 to infrared receiver 1052 in the satellite receiver 1054. As shown in FIG. 18, the satellite receiver 1054 receives signals from a satellite antenna. The satellite receiver 1054 tunes to the commanded channel and sends a television signal on channel 3 or 4 to VCR 1056, which can record the program and/or relay it to television monitor 1060. Commands can be sent to VCR 1056 from instant programmer 1040 in the same manner as from instant programmer 300 via the infrared transmitter 1042 in the instant programmer and the infrared receiver 1058 in the VCR 1056.

Figure 19:
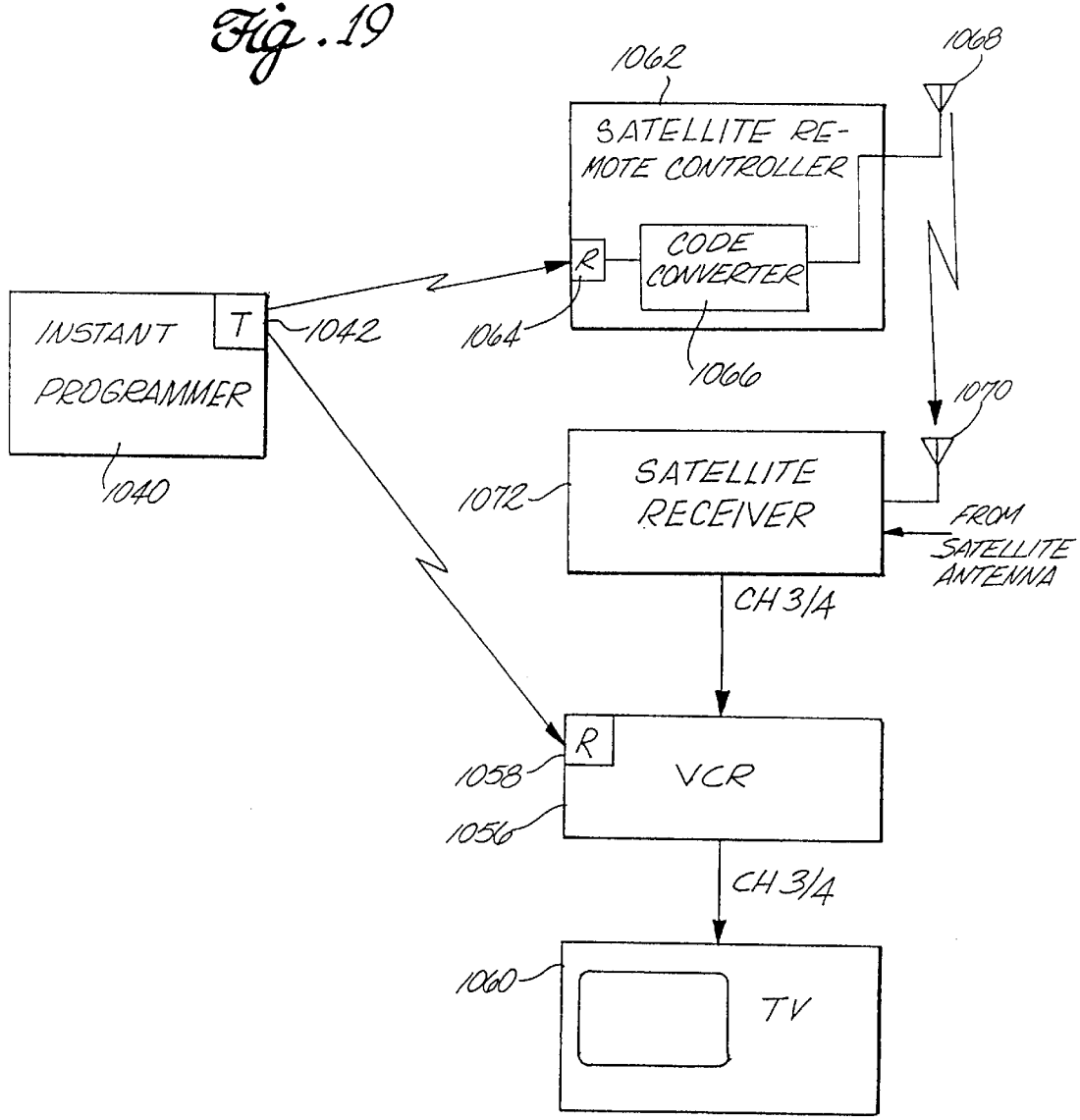
FIG. 19 is a block diagram of a system including an instant programmer, a satellite receiver, a satellite remote controller having a code converter and radio frequency (RF) communication to the satellite receiver, a VCR and a television, according to an embodiment of the invention.

FIG. 19 is a block diagram of a system including an instant programmer 1040, a satellite receiver 1072, a satellite remote controller 1062 having a code converter 1066, a VCR 1056 and a television 1060. This system operates in a manner similar to the system of FIG. 18, except that the communication from the satellite remote controller 1062 to the satellite receiver 1072 is via RF rather than infrared. The reason for this is that in the system of FIG. 19, the satellite receiver 1072 is assumed to be not in the same room as the satellite remote controller 1062. For example, the satellite receiver 1072 might be located adjacent to the satellite antenna. The instant programmer 1040 is setup to send commands using otherwise unused infrared codes (predetermined as unused cable box or VCR codes) via infrared transmitter 1042 to the infrared receiver 1064 on satellite remote controller 1062. The commands sent by the instant programmer 1040 and received by the satellite remote controller 1062 can include on/off commands and channel select commands. These on/off commands and channel select commands are intended for the satellite receiver 1072; however, before the commands are sent from the satellite remote controller 1062 to the satellite receiver 1072, the commands received by infrared receiver 1064 are converted by code converter 1066 to satellite receiver codes recognizable by satellite receiver 1072. The inclusion of a code converter 1066 in the satellite remote controller 1062 allows an instant programmer 1040 that is not capable of direct communication with the satellite receiver 1072 to be used to command turning on and off the satellite receiver and to command channel selection in the satellite receiver. The code converter can be implemented by a microcomputer and/or by looking up the code conversions in a table built into the satellite remote controller 1062. The commands converted into satellite receiver codes are sent to the satellite receiver 1072 via RF transmitter 1068 to RF receiver 1070 in the satellite receiver 1072. As shown in FIG. 19, the satellite receiver 1072 receives signals from a satellite antenna. The satellite receiver 1072 tunes to the commanded channel and sends a television signal on channel 3 or 4 to VCR 1056, which can record the program and/or relay it to television monitor 1060. Commands can be sent to VCR 1056 from instant programmer 1040 in the same manner as from instant programmer 300 via the infrared transmitter 1042 in the instant programmer and the infrared receiver 1058 in the VCR 1056.

In other embodiments the satellite remote controller operates with a television, VCR, a cable box and a satellite receiver to convert commands to and from the satellite receiver. These embodiments are useful when existing satellite receivers have a different protocol than a remote controller, such as a TV remote controller, a VCR remote controller, a cable box remote controller and a universal remote controller. The satellite remote controller operates with another remote controller, such as a universal remote controller, to convert commands from the remote controller to codes recognizable by a satellite receiver. It is less expensive to provide a satellite remote controller with the code conversion than to provide new satellite receivers with compatible protocols.

Figure 20:
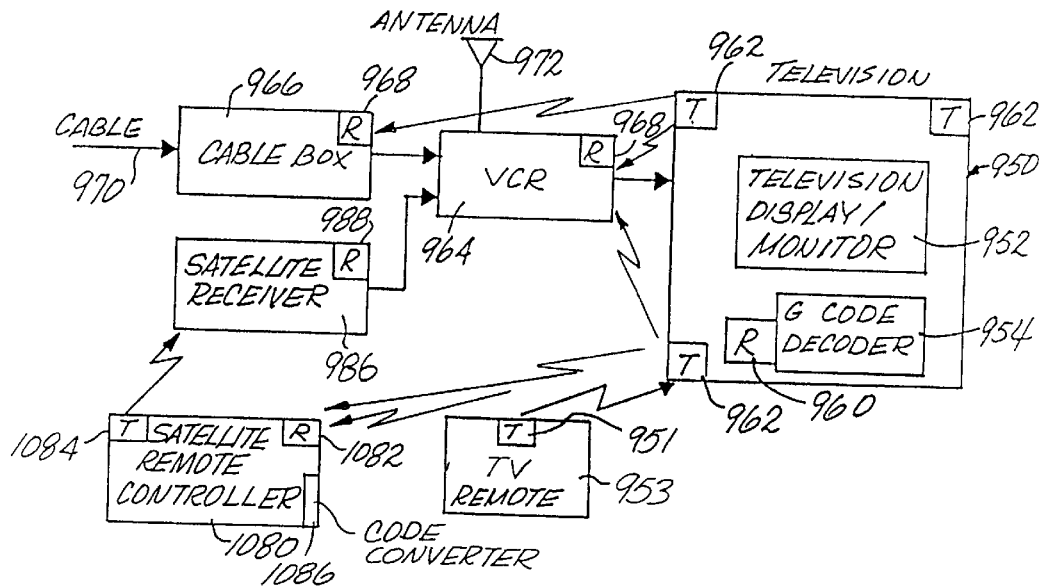
FIG. 20 is a block diagram of a system including a television having a G-code decoder, a VCR, a cable box, a satellite receiver, and a satellite remote controller having a code converter, according to an embodiment of the invention.

In FIG. 20, which is similar to FIG. 14 except for the satellite remote controller 1080, the television 950 contains a G code decoder 954. The television in this instance is performing the functions of an instant programmer. Infrared transmitter 962 on the television can send commands to satellite remote controller 1080 that receives the commands via infrared receiver 1082. The code converter 1086 in satellite remote controller 1080 then converts the received commands into codes recognizable by the satellite receiver 968 and retransmits the commands via infrared transmitter 1084. Commands can also be sent directly from TV remote controller 953, which can be a universal remote controller, to satellite remote controller 1080 and converted by code converter 1086 into commands recognizable by satellite receiver 986 and retransmitted via infrared transmitter 1084 to infrared receiver 988. The transmitter 1084 and the receiver 988 can also be implemented as an RF transmitter and RF receiver, respectively.

Figure 21:
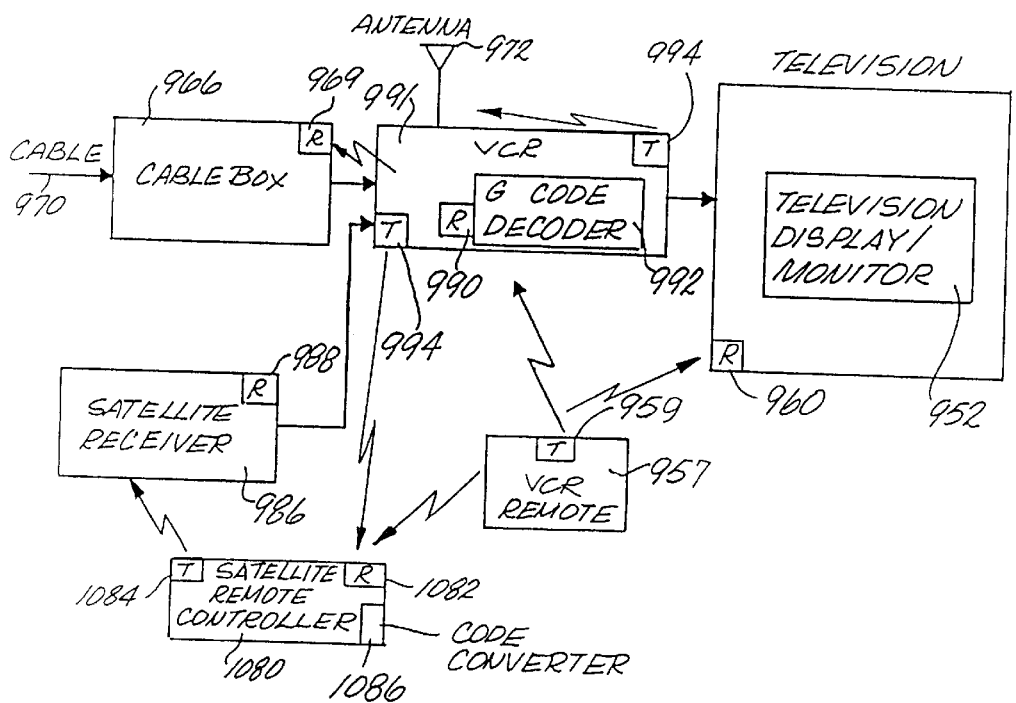
FIG. 21 is a block diagram of a system including a VCR having a G-code decoder, a television, a cable box, a satellite receiver, and a satellite remote controller having a code converter, according to an embodiment of the invention.

In FIG. 21, which is similar to FIG. 15 except for the satellite remote controller 1080, the VCR 991 contains a G code decoder 992. The VCR in this instance is performing the functions of an instant programmer. Infrared transmitter 994 on the VCR can send commands to satellite remote controller 1080 that receives the commands via infrared receiver 1082. The code converter 1086 in satellite remote controller 1080 then converts the received commands into codes recognizable by the satellite receiver 968 and retransmits the commands via infrared transmitter 1084. Commands can also be sent directly from VCR remote controller 957, which can be a universal remote controller, to satellite remote controller 1080 and converted by code converter 1086 into commands recognizable by satellite receiver 986 and retransmitted via infrared transmitter 1084 to infrared receiver 988. The transmitter 1084 and the receiver 988 can also be implemented as an RF transmitter and RF receiver, respectively.

Figure 22:
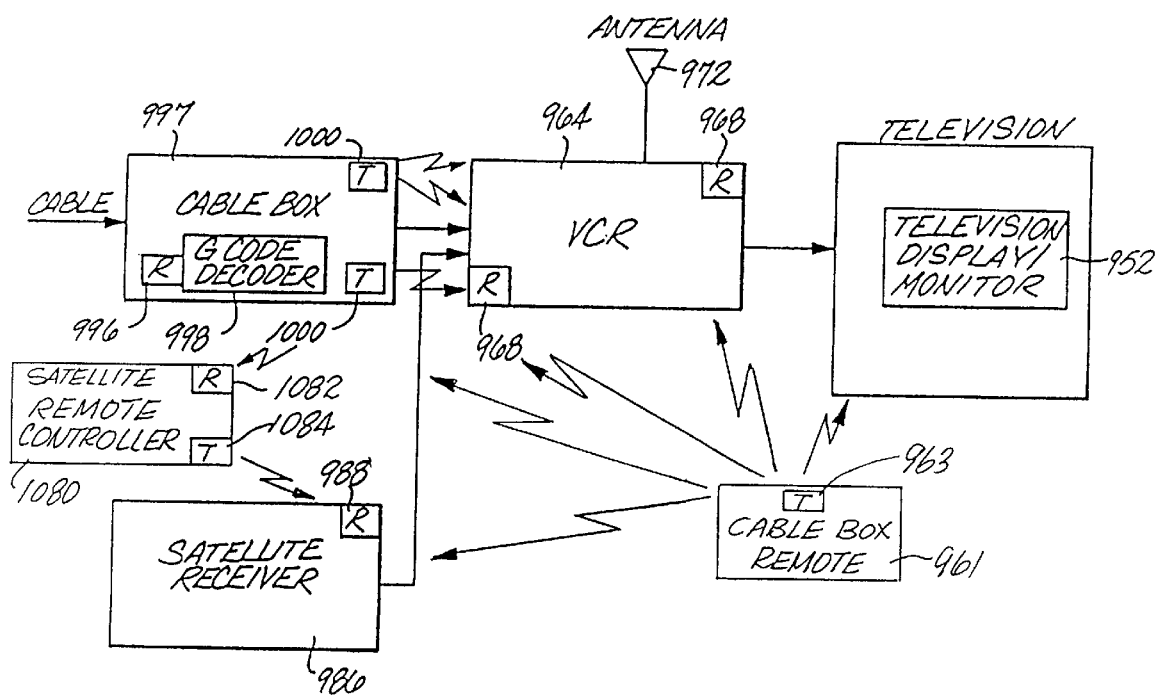
FIG. 22 is a block diagram of a system including a cable box having a G-code decoder, a television, a VCR, a satellite receiver, and a satellite remote controller having a code converter, according to an embodiment of the invention.

In FIG. 22, which is similar to FIG. 16 except for the satellite remote controller 1080, the cable box 997 contains a G code decoder 998. The cable box in this instance is performing the functions of an instant programmer. Infrared transmitter 1000 on the cable box can send commands to satellite remote controller 1080 that receives the commands via infrared receiver 1082. The code converter 1086 in satellite remote controller 1080 then converts the received commands into codes recognizable by the satellite receiver 986 and retransmits the commands via infrared transmitter 1084. Commands can also be sent directly from cable box controller 961, which can also be an universal remote controller, to satellite remote controller 1080 and converted by code converter 1086 into commands recognizable by satellite receiver 968 and retransmitted via infrared transmitter 1084 to infrared receiver 988. The transmitter 1084 and the receiver 988 can also be implemented as an RF transmitter and RF receiver, respectively.

Figure 23:
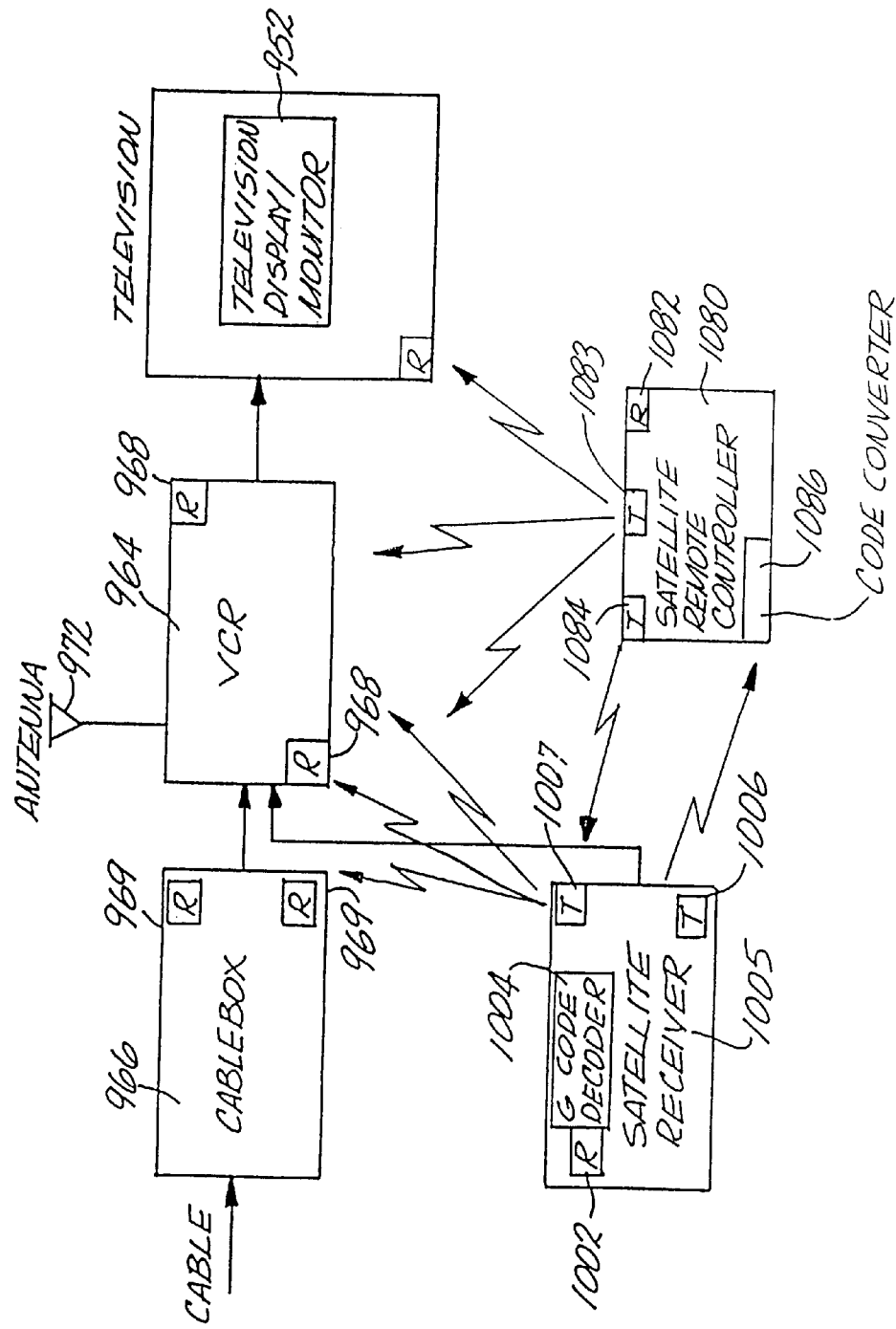
FIG. 23 is a block diagram of a system including a satellite receiver having a G-code decoder, a television, a VCR, a cable box, and a satellite remote controller having a code converter, according to an embodiment of the invention.

In FIG. 23, the satellite receiver 1005 contains a G code decoder 1004 and the satellite receiver in this instance is performing the functions of an instant programmer. The satellite remote controller 1080 can receive commands from and transmit commands to the satellite receiver 1005. The satellite receiver can send commands via transmitter 1006 to satellite remote controller 1080 via receiver 1082. The satellite remote controller 1080 can send commands via transmitter 1084 to satellite receiver 1005 via receiver 1002. The satellite receiver can be remote from the user and the other appliances, such as the cable box 966, the VCR 964 and the television 952. Therefore the transmitters 1006 and 1084 and the receivers 1002 and 1082 can be infrared or RF transmitters and receivers. The user operates the satellite remote controller 1080 to enter a code that signifies the program to be recorded. When a G-code is entered, the satellite remote controller sends the G-code to satellite receiver 1005 with G-code decoder 1004 via transmitter 1084 and receiver 1002. The G-code decoder 1004 decodes the code into CDTL and uses this information along with a clock, which is included in the satellite receiver 1005, to send the proper commands for the VCR 964 and the cable box 966 at the appropriate time so that the selected program will be recorded at the proper time. If the satellite receiver is in the same room as the cable box and the VCR, and if the satellite receiver can transmit the proper protocols, then the commands can be sent directly from the satellite receiver to the cable box and the VCR via transmitter 1007. If the satellite receiver is not in the same room as the cable box and the VCR and the satellite receiver is not capable of sending the proper protocol commands, then the commands are sent to the remote controller, which then can convert the received commands into codes recognizable by the cable box 966, VCR 964, and possibly television 952 and retransmits the commands via infrared transmitter 1083.

It is thought that the apparatus and method using compressed codes for television program record scheduling of the present invention and many of its attendant advantages will be understood from the foregoing description and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

What is claimed is:

1. A satellite remote controller used with a cable box channel selector that transmits a remote control cable box channel change command signal intended for a cable box, and a satellite receiver that tunes to a satellite broadcast television signal and includes a satellite remote control receiver for receiving remote control signals for satellite receivers and a means for controlling the tuning of the satellite broadcast television signal based upon the remote control signals for satellite receivers received by the satellite remote control receiver, the satellite remote controller comprising:

a receiver that receives and decodes the remote control cable box channel change command signal for the cable box;

a converter that converts the remote control cable box channel change command signal intended for the cable box into a remote control satellite channel change command signal intended for a satellite receiver; and a transmitter that transmits to the satellite receiver the remote control satellite channel change command signal intended for the satellite receiver.

2. The system of claim 1 wherein the receiver receives radio frequency remote control signals.

3. The system of claim 1 wherein the transmitter transmits radio frequency remote control signals.

4. The system of claim 1 wherein the converter further comprises a memory for storing channel mapping information for mapping a cable channel number contained in the remote control cable box channel change command signal intended for the cable box to a satellite channel number for inclusion in the corresponding remote control satellite channel change command signal intended for the satellite receiver.

5. A satellite television system comprising:

a device wirelessly transmitting a first type of channel command;

a satellite remote controller including:

a receiver wirelessly receiving the first type of channel command from the device;

a memory storing mapping information for mapping the first type of channel command to a satellite receiver channel command;

a converter converting the first type of channel command to the satellite receiver channel command based on the mapping information stored in the memory; and a transmitter wirelessly transmitting the satellite receiver channel command; and a satellite receiver wirelessly receiving the satellite receiver channel command from the satellite remote controller.

6. The system of claim 5, wherein the device is a television apparatus.

7. The system of claim 5, wherein the device is a recording apparatus.

8. The system of claim 5, wherein the device is a cable box.

9. The system of claim 5, wherein the device is a satellite receiver.

10. The system of claim 5, wherein the device is a remote controller.

11. The system of claim 5, wherein the device includes a decoder for decoding compressed codes representing channel, time-of-day, and length commands.

* * * * *